(12) United States Patent  
Felderman et al.

(10) Patent No.: US 8,248,930 B2
(45) Date of Patent: Aug. 21, 2012

(54) METHOD AND APPARATUS FOR A NETWORK QUEUING ENGINE AND CONGESTION MANAGEMENT GATEWAY

(75) Inventors: Robert Edman Felderman, Portola Valley, CA (US); Roy M. Bannon, Palo Alto, CA (US); Peter Hochschild, New York, NY (US); Guenter Roeck, San Jose, CA (US); Hain-Ching Humphrey Liu, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/387,196

(22) Filed: Apr. 28, 2009

(65) Prior Publication Data

US 2009/0268612 A1 Oct. 29, 2009

Related U.S. Application Data

(60) Provisional application No. 61/048,913, filed on Apr. 29, 2008.

(51) Int. Cl.
H04L 12/56 (2006.01)
(52) U.S. Cl. ........................................ 370/230; 370/232
(58) Field of Classification Search ................... 370/236, 370/235, 230, 237, 230.1
See application file for complete search history.

(56) References Cited

U.S. PATENT DOCUMENTS

| 5,570,348 A | 10/1996 | Holden | |
| 7,830,797 B1 * | 11/2010 | Nachum et al. | ............ 370/230.1 |
| 2003/0156542 A1 | 8/2003 | Connor | |
| 2004/0008628 A1 | 1/2004 | Banerjee | |
| 2006/0092840 A1 * | 5/2006 | Kwan et al. | ................. 370/230.1 |
| 2007/0237083 A9 * | 10/2007 | Oh et al. | ........................ 370/235 |
| 2008/0267073 A1 * | 10/2008 | Thaler | ............................ 370/236 |
| 2008/0298248 A1 * | 12/2008 | Roeck et al. | .................. 370/237 |

FOREIGN PATENT DOCUMENTS

| KR | 20040077249 A | 9/2004 |
| KR | 20050087203 A | 8/2005 |

OTHER PUBLICATIONS

PCT Notification of Transmittal of the International Search Report and the Written Opinion of the International Searching Authority, or the Declaration for PCT/US 09/002675, Dec. 23, 2009, 11 pages.

* cited by examiner

*Primary Examiner* — Steven H Nguyen
*Assistant Examiner* — Syed M Bokhari
(74) *Attorney, Agent, or Firm* — Lerner, David, Littenberg, Krumholz & Mentlik, LLP

(57) ABSTRACT

A method, apparatus, and queuing engine implement congestion management. The method may include receiving, via a first interface of the apparatus, data traffic for forwarding to a node of a network. The method may also include receiving, at a second interface of the apparatus, a notification that indicates that congestion is affecting communication with the node, and responsive to the notification, accumulating the data traffic into the queue for a given time period. The method may further include dequeuing the data traffic from the queue after the given time period; and sending the portion of the data traffic to the node via the second interface.

14 Claims, 13 Drawing Sheets

US 8,248,930 B2

METHOD AND APPARATUS FOR A NETWORK QUEUING ENGINE AND CONGESTION MANAGEMENT GATEWAY

CROSS-REFERENCE TO RELATED APPLICATIONS

This application claims the benefit of the filing date of U.S. Provisional Patent Application No. 61/048,913 filed Apr. 29, 2008, the disclosure of which is hereby incorporated herein by reference.

BACKGROUND OF THE TECHNOLOGY

The present technology generally relates to devices for performing congestion management, and more particularly, to devices for performing congestion management at a second or a data link layer of a computer network.

A computer network typically includes multiple computers ("end nodes") that communicatively couple with one or more networking nodes or devices (collectively "interconnect nodes"). These interconnect nodes, in turn, communicatively couple together to facilitate communication of data traffic among such end nodes. Generally, the interconnect nodes are or include switches, bridges and the like.

At times, the computer network may suffer from congestion caused due to a given interconnect node ("congested node") being unable to send more data traffic than it receives. Typically, the congested node along with the interconnect nodes that communicatively with the congested nodes ("congestion-affected nodes") attempt to redress the congestion in two ways. The congested node and the congested-affected nodes may redress the congestion by (i) dropping one or more of packets of the data traffic or (ii) slowing down their rates of delivery of the data traffic to prevent packet loss. The congested node and the congestion-affected nodes may use various strategies for dropping packets, including, for example, tail-drop or Random Early Detection ("RED"). Dropping packets, however, may degrade performance of applications that rely on them because any packet dropped has to be re-transmitted after a timeout occurs.

In addition to or instead of dropping packets, the congested node and the congestion-affected nodes may employ flow control. To facilitate the flow control, the congested node may send one or more messages ("flow-control messages"), such as PAUSE messages, to the congestion-affected nodes to cause them to slow down delivery of the data traffic. Responsive to the flow-control messages, each of the congestion-affected nodes typically slow down delivery of the data traffic significantly. Because the slow down of each of the congestion-affected nodes, spreads to other interconnect nodes, the congestion affecting the congested node effectively spreads through the entire computer network.

BRIEF SUMMARY OF THE TECHNOLOGY

Some embodiments of the present technology may include a method, apparatus, gateway and queuing engine for congestion management. The method may include receiving, via a first interface of the apparatus, data traffic for forwarding to a node of a network. The method may also include receiving, at a second interface of the apparatus, a notification that indicates that congestion is affecting communication with the node, and responsive to the notification, accumulating the data traffic into the queue for a given time period. The method may further include dequeuing the data traffic from the queue after the given time period; and sending the portion of the data traffic to the node via the second interface.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

In the following detailed description, numerous specific details are set forth in order to provide a thorough understanding of example embodiments or other examples described herein. However, it will be understood that these embodiments and examples may be practiced without the specific details. In other instances, well-known methods, procedures, components and circuits have not been described in detail, so as not to obscure the following description. Further, the embodiments and/or examples disclosed are for exemplary purposes only and other embodiments and/or examples may be employed in lieu of or in combination with the embodiments disclosed.

Accordingly, the following technology may serve many purposes. For example, it may serve as queuing engine for performing congestion management. It may permit interconnection between congestion managed domains and non-congestion managed domains of a network, such that the interconnection allows data flows passing through such network benefit from the congestion management. It may provide queuing functionality for a congested link in a network, when, for example, network elements of such network lack functionality to buffer sufficient data or do not support congestion management. It may also provide a method and apparatus to separate congestion managed domains into multiple sub-domains and manage congestion between those sub-domains to reduce the latency per sub-domain given that congestion can also occur in congestion managed domains where longer latency may be experienced (e.g., due to the physical distance). Other benefits and features will also be evident from the following description, drawings and claims.

Overview

Figure 1:
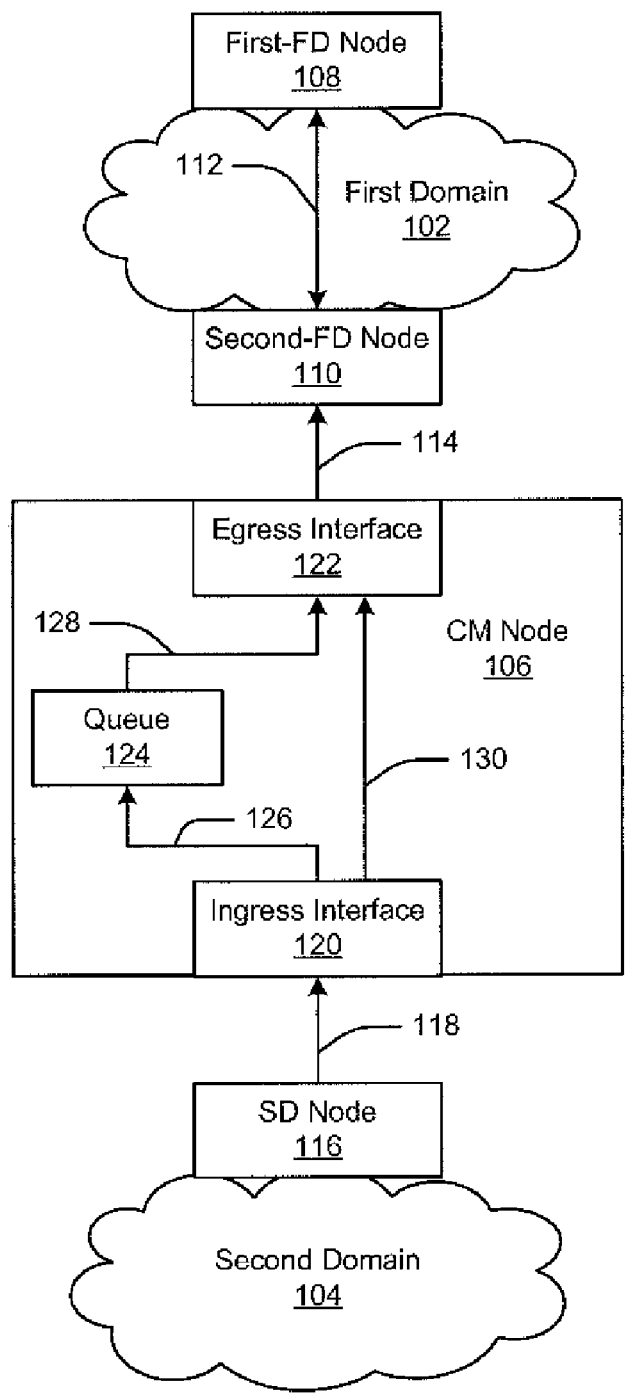
FIG. 1 is a block diagram illustrating a first example network in accordance with one or more aspects of the technology.

FIG. 1 is a block diagram illustrating an example network 100 in accordance with one or more aspects of the technology. The network 100 may include a first domain 102, a second domain 104, and a network node for performing congestion management ("CM node") 106.

The first domain ("FD") 102 may include a first node ("first-FD node") 108, and a second node ("second-FD node") 110. The first-FD node 108 may be, for example, an interconnect device, such as a network switch, bridge and the like. Alternatively, the first-FD node 108 may be an end node, such as a server or other computer.

The second-FD node 110 may be an interconnect device, and may communicatively couple with the first-FD node 110 via a communication link (or simply, "link") 112. The second-FD node 110 and/or the first-FD node 108 may employ one or more protocols for discovering, ascertaining and/or assessing congestion that affects communication with the first-FD node 106.

Pursuant to the protocols, the second-FD node 110 may discover congestion that detrimentally affects (e.g., limits, restricts or otherwise constrains a bandwidth capacity for carrying out) communication with the first-FD node 108. Responsive to this discovery, the second-FD node 110 may generate or obtain from the first-FD node 108 a ("congestion-notification") message to notify the CM node 106 of such congestion. To provide the congestion-notification message to and otherwise communicate with the CM node 106, the second-FD node 110 may communicatively couple with the CM node 106 via link 114.

The second domain ("SD") 104 may include a node ("SD node") 116. Like the first FD-node 108, the SD node 116 may be an interconnect or end node. To facilitate communication with the CM node 106, the SD node 116 may communicatively couple with the CM node 106 via link 118. Using the link 118, the SD node 116 may send to the CM node 106 data traffic for forwarding to the FD 102 ("FD-destined traffic"). The FD-destined traffic may include a data flow having a plurality of packets addressed to the first-FD node 108 ("first-FD flow") along with one or more other flows for the FD 102.

The CM node 106 may include an ingress interface 120, an egress interface 122, a queue 124, a first data path 126, a second data path 128 and a third data path 130. The ingress interface 120 may communicatively couple with and receive the FD-destined traffic from the SD node 116 via the link 118. In addition, the ingress interface 120 may interface with and send the FD-destined traffic to the first data path 126.

The first data path 126 may define a first series of links that interconnects and carries the FD-destined traffic from the ingress interface 120 to the queue 124. Similarly, the second data path 128 may define a second series of links that interconnects and carries the FD-destined traffic from the queue 124 to the egress interface 122. The third data path 130 may define a third series of links that interconnects and carries the FD-destined traffic between ingress interface 120 and the egress interface 122 without interconnecting with the queue 124.

The egress interface 122 may interface with and receive the FD-destined traffic from the second data path 128. In addition, the egress interface 122 may communicatively couple with the second-FD node 110 via the link 114. Through this link 114, the egress interface 122 may send the FD-destined traffic to and receive the congestion-notification message from the second-FD node 110.

Responsive to the congestion-notification message, the queue 124 may be configured to accumulate the FD-destined traffic for a given time period. The queue 124 may also be configured to dequeue or otherwise send the FD-destined traffic to the second data path 128 after the time period. The given time period may be configured to cause rate limiting so as to satisfy a first bitrate for delivering the FD-destined traffic to the first-FD node 108 in accordance with the congestion. Alternatively, the given time period may be configured to cause a pause and then a resume of the delivery of the FD-destined traffic to the first-FD node 108.

The queue 124 may be further configured to accumulate and dequeue the FD-destined traffic when congestion is not detrimentally affecting such first-FD node 108. For example, the queue 124 may be configured to accumulate and dequeue the FD-destined traffic at the same or substantially the same rate, or at a bitrate other than the given bitrate.

Figure 2:
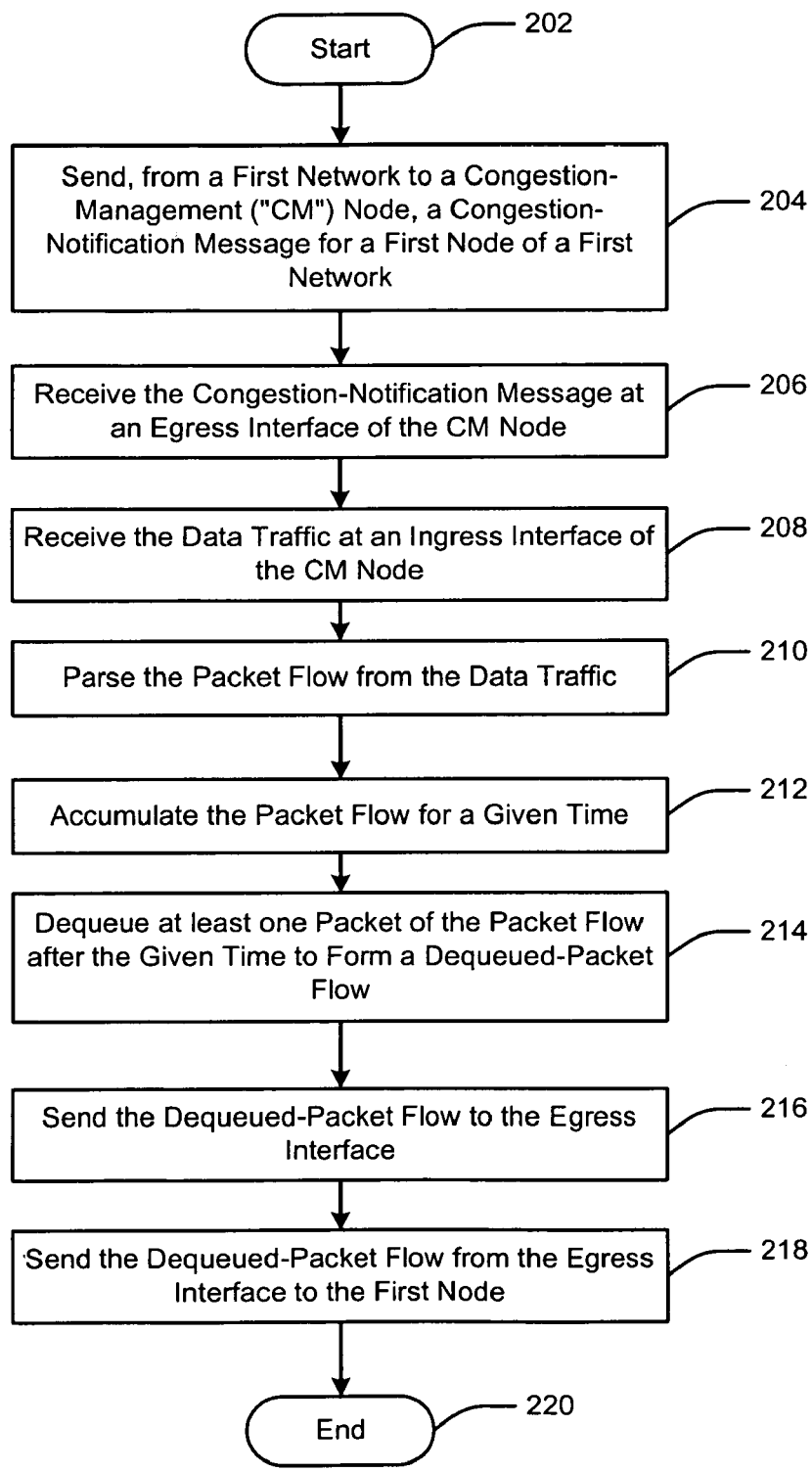
FIG. 2 is a flow diagram illustrating a first example flow for performing congestion management.

Referring now to FIG. 2, a flow diagram illustrating an example flow 200 for performing congestion management is shown. For convenience, the following describes the flow 200 with reference to the network 100 of FIG. 1. The flow 200 may be carried out using other architectures as well.

The flow 200 begins at termination block 202. Prior to termination block 202, the SD node 116 may send the FD-destined traffic to the CM node 106, which, in turn, receives it at its ingress interface 120. The ingress interface 120 may then send the FD-destined traffic to the third data path 130. The third data path 130 may, in turn, relay the FD-destined traffic to the egress interface 122 for forwarding to the FD 102.

Alternatively, the ingress interface 120 may send the FD-destined traffic first data path 126, which, in turn, relays it to the queue 124. The queue 124 may accumulate, and then dequeue the FD-destined traffic to the second data path 128 so as to cause the egress interface 122 to supply it to the FD 102 unfettered or in accordance with traffic conditions of the FD 102.

At some point, the data traffic traversing the FD 102 causes congestion that detrimentally affects communication with the first-FD node 108. Responsive to this congestion, the second-FD node 110 sends a congestion-notification message to the CM node 106, as shown in process block 204. The CM node 106, in turn, receives the congestion-notification message at its egress interface 122, as shown in process block 206.

At some point in time before or after the CM receives the congestion-notification message, the SD node 116 sends to the CM node 106 the FD-destined traffic that includes the first-FD flow, as shown in process block 208. The CM node 106, in turn, receives the FD-destined traffic at its ingress interface 120, as shown in process block 210. Responsive to the congestion-notification message, the CM node 106 may set the given time period to cause rate limiting or, alternatively, to cause a pause and then a resume of the delivery of the FD-destined traffic to the first-FD node 108.

The CM node 106 may then parse the first-FD flow from the FD-destined traffic, as shown in process block 212. Thereafter, the CM node 106 accumulates the first-FD flow in the queue 124 for the given time period, as shown in process block 214. To facilitate this, the ingress interface 120 may first send the first-FD flow to the first data path 126, which, in turn, relays it to the queue 124.

After the given time period, the CM node 106 dequeues, from the queue 124 to the second data path 128, one or more packets of the first-FD flow so as to form a dequeued-first-FD flow, as shown in process block 216. The CM node 106 then sends the dequeued-first-FD flow to the egress interface 122, via second data path 128, as shown in process block 218.

Thereafter, the CM node 106 sends the dequeued-first-FD flow to the second-FD node 110 for forwarding to the first-FD node 108, as shown in process block 220.

After process block 220, the flow 200 transitions to termination block 222, whereupon the flow 200 terminates. Alternatively, the flow 200 may be repeated periodically, in continuous fashion, or upon being triggered as a result of a condition. Additionally and/or alternatively, the process blocks 210-212 may be repeated without repeating the entire flow 200. Further, upon cessation of the congestion, the CM node 106 may supply additional FD-destined traffic to the FD 102 unfettered or in accordance with traffic conditions of the FD 102 at such time.

Example Architecture

Figure 3:
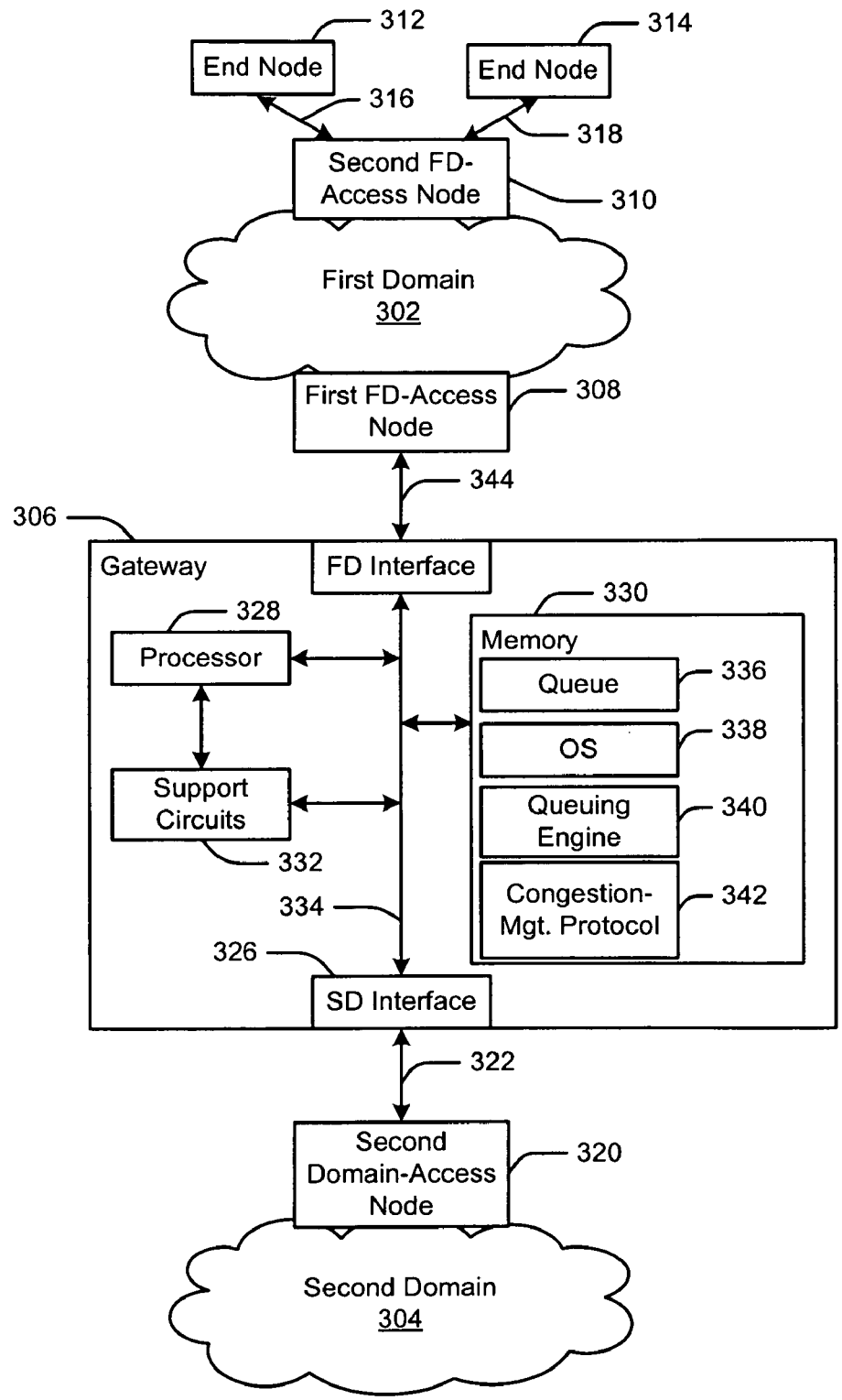
FIG. 3 is a block diagram illustrating a second example network in accordance with one or more aspects of the technology.

FIG. 3 is a block diagram illustrating an example network 300 in accordance with one or more aspects of the technology. The network 300 may include a FD 302, a SD 304 and a gateway 306 that straddles both the FD and SD 302,304. As described in more detail below, the FD 302 employs a common protocol for performing congestion management within the first domain 102 (hereinafter "CM protocol"), and the SD 304 does not.

The FD 302 may be a partial or full deployment of most any communication or computer network, including any of a public or private, terrestrial wireless or satellite, or wireline network. The FD 302 may include a first and second access nodes ("FD-access node") 308, 310. The FD 302 may also include first and second end nodes ("FD-end nodes") 312, 314; each of which may be, for example, a server or other computer.

Each of the first and second FD-access nodes 308, 310 may be an interconnect device, such as a network switch, bridge and the like. Accordingly, the first FD-access node 308 may include two interfaces (not shown). The first FD-access node 308 may use one interface for communicating within the FD 302 ("first FD-facing interface"). The first FD-access node 308 may use the other interface for communicating with the gateway 306 ("first FD-access interface"). Analogously, the second FD-access node 310 may include a second FD-facing interface and a second FD-access interface. The second FD-access node 310 may use (i) the second FD-facing interface for communicating within the FD 302, and (ii) the second FD-access interface for communicating with the first and second FD-end nodes 312, 314 via links 316,318, respectively.

The FD 302 may also include a number of other elements ("other FD elements"); none of which are shown for simplicity of exposition. These other FD elements may include, for example, one or more network interconnect nodes ("other FD-interconnect nodes") and one or more end nodes ("other FD-end nodes").

The other FD elements may also include one or more links ("other FD links"). Using these other links, the other FD-end nodes may communicatively couple with the other FD-interconnect nodes. One or more of the other FD-interconnect nodes may also use the other FD links to communicatively couple together. In addition, the first and second FD-access nodes 308, 310 may use the other FD links in conjunction with the first and second FD-access interfaces to communicatively couple with each other and/or with one or more of the other FD-interconnect nodes.

Each of the first and second FD-access nodes 308, 310, the first and second FD-end nodes 312,314 and the other FD elements may communicate using any of a standardized, proprietary, open-source, and freely-available communication protocol for communicating in packet data networks and the like. For example, the first and second FD-access nodes 308, 310, the first and second FD-end nodes 312,314 and the other FD elements may communicate using one or more of the Institute of Electrical and Electronic Engineers ("IEEE") 802.3 standards, including any of the Fast Ethernet, Gigabit Ethernet ("GE") and 10-Gigabit Ethernet ("10GE") protocols.

Each of the first and second FD-access nodes 308, 310, the first and second FD-end nodes 312,314 and the other FD-interconnect and FD-end nodes employ the CM protocol. The CM protocol may, for example, support congestion flow and/or bandwidth management to avoid congestive collapse. To do so, the CM protocol may define one or more rules, algorithms and conventions for discovering, ascertaining, assessing and/or reporting a bandwidth constraint for one or more link paths in the FD 302. For instance, the CM protocol may support active probing or other protocol for performing self assessment of the bandwidth constraints.

The CM protocol may also define a bitrate (or an algorithm for determining such bitrate) for rate limiting and/or traffic shaping data traffic carried on each of the link paths. The CM protocol may further define rules for tagging or otherwise marking data traffic affected by bandwidth constraints.

Pursuant to the CM protocol, the second FD-access node 310 may generate a first congestion-notification message to report congestion on the link 316 in response to such congestion occurring on the link 316. Similarly, the second FD-access node 310 may generate a second congestion-notification message to report congestion on the link 318 in response to congestion occurring on the link 318.

After generating the first and/or second congestion-notification messages, the second FD-access node 310 may send such congestion-notification messages to any of the first FD-access node 308, other FD-interconnect nodes and gateway 306. The second FD-access node 310 may, for example, broadcast the first and/or second congestion-notification messages to the first FD-access node 308, other FD-interconnect nodes and gateway 306. Alternatively, the second FD-access node 310 may multicast the first and/or second congestion-notification messages to two or more of the first FD-access node 308, other FD-interconnect nodes and gateway 306.

As another alternative, the second FD-access node 310 may unicast the first and/or second congestion-notification messages to one or more of the first FD-access node 308, the other FD-interconnect nodes and the gateway 306. Additionally and/or alternatively, the first FD-access node 308, the other FD-interconnect nodes and the gateway 306 that receive the first and second congestion-notification messages may, in turn, relay or propagate them to one or more of those that did not.

The first FD-access node 308 may generate a third congestion-notification message to report congestion that constrains communication with and/or to the first FD-end node 312. Analogously, the first FD-access node 308 may generate a fourth congestion-notification message to report congestion that constrains communication with and/or to the second FD-end node 314.

After generating the third and/or fourth congestion-management messages, the first FD-access node 308 may send such congestion-notification messages to any of the second FD-access node 310, the other FD-interconnect nodes and the gateway 306. The first FD-access node 308 may, as appropriate, broadcast, multicast or unicast the third and/or fourth congestion-notification messages to the second FD-access node 310, the other FD-interconnect nodes and the gateway 306. Additionally and/or alternatively, the second FD-access node 310, the other FD-interconnect nodes and the gateway 306 that receive the third and fourth congestion-notification messages may, in turn, relay or propagate them to one or more of those that did not.

The SD 304, like the FD 302, may be a partial or full deployment of most any communication or computer network, including any of a public or private, terrestrial wireless or satellite, or wireline network. The SD 304 may include an access node ("SD-access node") 320. The SD-access node 320 may be a interconnect device, such as a network switch, bridge and the like. Accordingly, the SD-access node 320 may include two interfaces (not shown). The SD-access node 320 may use one interface for communicating within the SD 304 ("SD-facing interface"). The SD-access node 320 may use the other interface for communicating with the gateway 306 ("SD-access interface").

The SD 304 may also include a number of other elements ("other SD elements"); none of which are shown for simplicity of exposition. These other SD elements may include, for example, one or more network interconnect nodes ("other SD-interconnect nodes") and one or more end nodes ("other SD-end nodes").

The other SD elements may also include one or more links ("other SD links"). Using these other links, the other SD-end nodes may communicatively couple with the other SD-interconnect nodes. One or more of the other SD-interconnect nodes may also use the other SD links to communicatively couple together. In addition, the SD-access node 320 may use the other SD links in conjunction with the SD-access interface to communicatively couple with one or more of the other SD-interconnect nodes.

The SD-access node 320 and the other SD elements may communicate using any of a standardized, proprietary, open-source, and freely-available communication protocol for communicating in packet data networks and the like. For example, the SD-access nodes 320 and the other SD elements may communicate using one or more of the IEEE 802.3 standards, including any of the Fast Ethernet, GE and 10GE protocols. The SD-access node 320 does not employ the congestion-management protocol.

The SD-access node 320 may send FD-destined traffic to the gateway 106, via a link 322. This FD-destined traffic may include, for example, first and second flows. The first flow may be addressed to the first FD-end node 312, and the second flow may be addressed to the second FD-end node 314.

The gateway 306 may include a FD interface 324, a SD interface 326, one or more processing units (collectively "processor") 328, memory 330, support circuits 332 and one or more busses (collectively "bus") 334. The SD interface 332 may be configured to communicatively couple with the SD-access node 320 via the third link 322.

The SD interface 326 may control one or more exchanges of FD-destined traffic between the SD-access node 320 and the bus 124. To facilitate this, the SD interface 326 may employ any of the standardized, proprietary, open-source, and freely-available communication protocol for communicating in packet data networks and the like. By way of example, the SD interface 326 may employ one or more of the IEEE 802.3 standards, including any of the Fast Ethernet, GE and 10GE protocols.

The processor 328 may be one or more conventional processors, microprocessors, multi-core processors and/or microcontrollers. The bus 334 may be configured to provide one or more transmissions of digital information among the FD interface 324, SD interface 326, processor 328, memory 330, and support circuits 332. The support circuits 332 may be configured to facilitate one or more operations of the processor 328. The support circuits 332 may include well-known circuitry or circuits, including, for example, one or more input/output ("I/O") interfaces, cache, clock circuits, power supplies and the like.

The memory 330 may be or employ any of random access memory, read-only memory, optical storage, magnetic storage, removable storage, erasable programmable read only memory and variations thereof, content addressable memory and variations thereof, flash memory, disk drive storage, removable storage and the like. The memory 330 may include a queue 336. This queue 336 may be persistently allocated or, alternatively, may be allocated and de-allocated on-the-fly.

Although shown as a single entity, the queue 336 may be subdivided in two or more queues. As described in more detail below, the queue 336 may store one or more packets of FD-destined traffic.

The memory 330 may also store, and receive one or more queries from the processor 328 to obtain for execution, an operating system 338 and various executable modules, including a queuing engine 340 and a CM-protocol stack 342. As executable modules, each of the queuing engine 340 and CM-protocol stack 342 may include one or more of programmable and/or hard-coded, executable instructions, commands, directions, code and/or control data (collectively, "directives"), which may be implemented in hardware, firmware and/or software. Under execution by the processor, the operating system 338 may provide a platform onto which the queuing engine 340 and the CM-protocol stack 342 may be executed.

The CM-protocol stack 342 may configure the gateway 106 to apply the CM protocol to the FD-destined traffic received via the SD interface 326. For example, the CM-protocol stack 342 may configure the processor 328 to obtain the first, second, third and fourth congestion-notification messages. The CM-protocol stack 342 may also configure the processor 328 to execute the queuing engine 340 in response to receiving the first, second, third and fourth congestion-notification messages.

In addition, the CM-protocol stack 342 may configure the processor 328 to pass to the queuing engine 340 a first bitrate for communicating with the first FD-end node 313, and/or a second bitrate for communicating with the second FD-end node 314. The processor 328 may obtain the first bitrate from the first and/or third congestion-notification messages, and obtain the second bitrate from the second and/or fourth congestion-notification messages. Alternatively, the processor 328 may obtain the first and second bitrates from CM-protocol stack 342.

The queuing engine 340, in turn, may configure the gateway 306 to accumulate the first and/or second flows into and/or dequeue the first and/or second flows from the queue 324 in accordance with the CM protocol. For example, the queuing engine 340 may configure the processor 328 to accumulate the first flow into and dequeue the first flow from the queue 324 to satisfy the first bitrate. The queuing engine 340 may also configure the processor 328 to accumulate the second flow into and dequeue the second flow from the queue 324 to satisfy the second bitrate.

The FD interface 324 may communicatively couple with the first FD-access node 308 via link 344. The FD interface 324 may also control one or more exchanges of the FD-destined traffic, including the first and second flows, between the first FD-access node 308 and the bus 334. To facilitate this, the FD interface 324 may employ any of the standardized, proprietary, open-source, and freely-available communication protocol for communicating in packet-data networks and the like. For example, the FD interface 324 may employ one or more of the IEEE 802.3 standards, including any of the Fast Ethernet, GE and 10GE protocols.

Example Congestion Control

Figure 4:
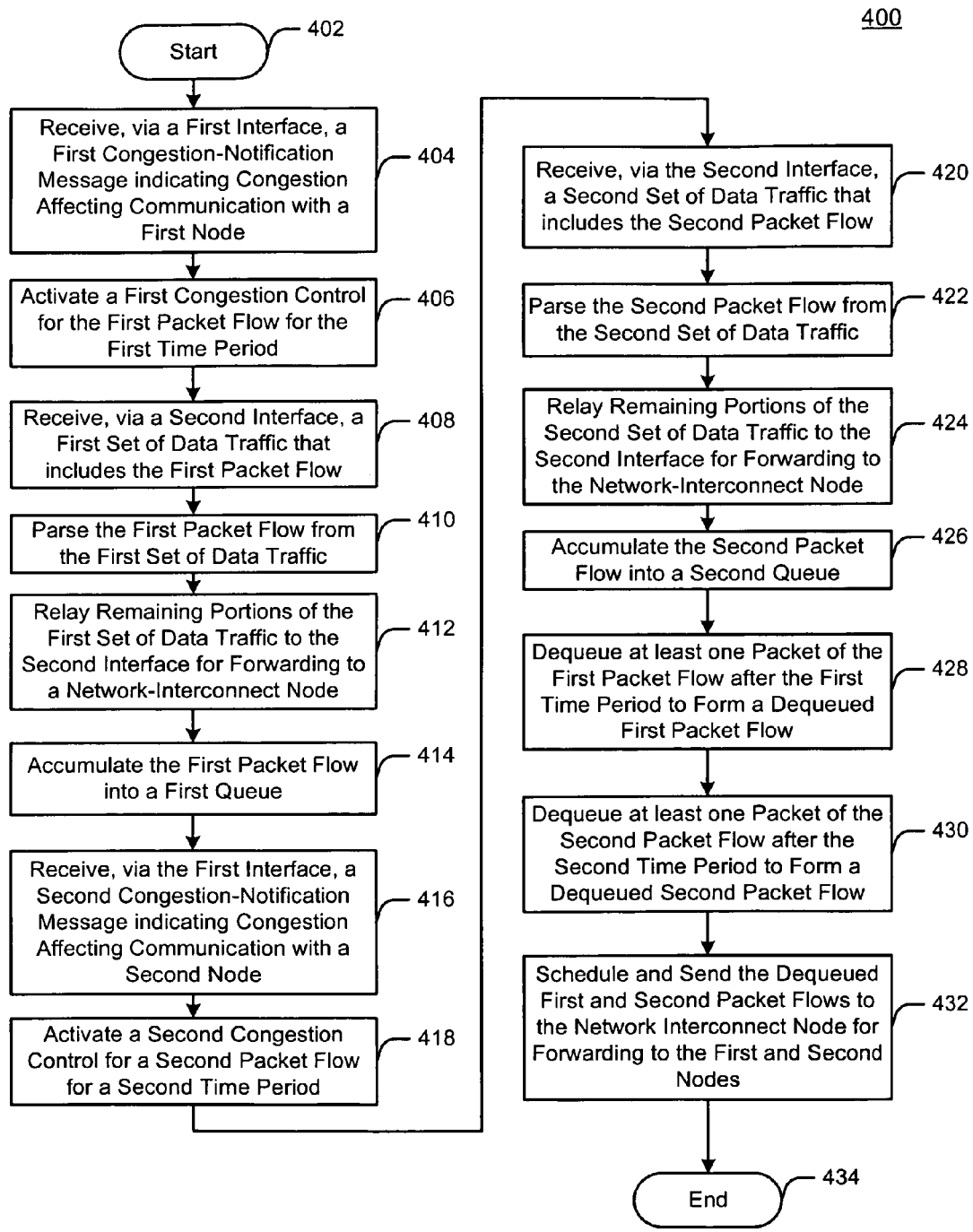
FIG. 4 is a flow diagram illustrating a second example flow for performing congestion management.

FIG. 4 is a flow diagram illustrating an example flow 400 for performing congestion management. For convenience, the following describes the flow 400 with reference to operation of the gateway 306 of FIG. 3. The flow 400 may be carried out using other architectures as well.

Prior to an initiation of the flow 400 at process block 402, the gateway 306 becomes operative, such the operating system 338, queuing engine 340 and CM-protocol stack 342 are retrieved from the memory 330 and executed by the processor 328. As such, the gateway 306 functions as a specially programmed computer for carrying out any of the functions noted above and below. Any reference below to the queuing engine 340 and CM-protocol stack 342 assumes that they and the directives therein are under execution by the processor 328.

Also, at a time just prior to the initiation of the flow 400, the first FD-access node 308 has not ascertained that congestion is detrimentally affecting either of the first and second end nodes 312, 314. As such, the gateway 306 relays to the first FD-access node 308 any of the FD-destined traffic it receives from the SD access node 320 ("pre-congestion traffic"). The gateway 306 may relay the pre-congestion traffic to the first FD-access node 308 in different ways.

For instance, the gateway 306 may invoke the queuing engine 338 for the pre-congestion traffic. After being invoked, the queuing engine 338 allocates and/or reserves one or more portion of the queue 336 for use with the pre-congestion traffic. In addition, the queuing engine 338 instructs the SD interface 326 to transfer any of the pre-congestion traffic to the bus 334 for forwarding to the queue 336. The queuing engine 338 may then accumulate the pre-congestion traffic to and dequeue the pre-congestion traffic from the queue 336 at a rate commensurate with a then current bandwidth capacity between the gateway 306 and the first FD-access node 308.

As an alternative, the gateway 306 may cause SD interface 326 to pass the pre-congestion traffic to the bus 334 for forwarding to the FD interface 324 without passing through the queue 336. This way, gateway 306 may send the pre-congestion traffic to the first FD-access node 308 at a rate commensurate with a given speed of the gateway 306.

At some point in time, the first FD-access node 308 ascertains that congestion is detrimentally affecting the first end node 506, and responsively sends the first (or third) congestion-notification message to the gateway 306. In accordance with the CM protocol, the first (or third) congestion-notification message and/or CM-protocol stack 342 includes the first bitrate.

At some point in time after initiation of the flow 400 at termination block 402, the gateway 306 receives the first congestion-notification message at its FD interface 324, as shown in process block 404. Responsively, the CM-protocol stack 342 activates a first congestion control for the first-flow for a first time period, as shown in process block 406.

As part of activating the first flow control, the CM-protocol stack 342 obtains the first bitrate and determines the first time period in accordance with the CM protocol. Thereafter, the CM-protocol stack 342 triggers the processor 328 to invoke the queuing engine 340 for any of the first flow received during the first time period. After being invoked, the queuing engine 340 allocates, re-allocates and/or reserves some or the entire queue 336 for use with the first flow received during the first time period. In addition, the CM-protocol stack 342 instructs the SD interface 326 to transfer any of the first flow it receives during the first time period to the bus 334 for forwarding to the queue 336.

At some point thereafter, the gateway 306 receives a first set of the FD-destined traffic via the SD interface 326, as shown in process block 408. Pursuant to the first congestion control, the SD interface 326 parses the first flow from the first set of the FD-destined traffic, as shown in process block 410.

As an option, the SD interface 326 may relay the remaining portions of the first set of FD-destined traffic to the FD interface 324 for forwarding to the first FD-access node 308, as shown in optional process block 412. As above, the SD interface 326 may relay the remaining portions of the first set of FD-destined traffic to the first FD-access interface 324 in different ways. The SD interface 326 may, for example, cause the queuing engine 340 to accumulate the remaining portions of the first set of FD-destined traffic to and dequeue such remaining portions from the a portion of the queue 336 not otherwise allocated. The queuing engine 340 may do so, for example, a rate commensurate with a then current bandwidth capacity between the gateway 306 and the first and/or second FD-access nodes 308, 310.

Alternatively, the SD interface 326 may pass the remaining portions of the first set of the FD-destined traffic to the bus 334 for forwarding to the FD interface 324 without passing it through the queue 336. As above, the remaining portions of the first set of the FD-destined traffic may be sent to the first and/or second FD-access nodes 308, 314 at a rate commensurate with the speed of the gateway 306.

After being parsed, the queuing engine 340 accumulates the first flow into the queue 336 for the first time period, as shown in process block 414. To carry this out, the queuing engine 340 instructs the SD interface 526 to transfer the first flow to the bus 336, which in turn, forwards it to the queue 336. Due to inherent delays in communications and processing, the queuing engine 340 may accumulate the first flow into the queue 336 for a time period less than the first time period. Such time period may be less to compensate for the inherent delays and to prevent undesirable latencies.

Prior to the expiration of the first time period, the gateway 306 receives the second (or fourth) congestion-notification message at its FD-interface 324, as shown in process block 416. Reception of the second (or fourth) congestion-notification message, as above, indicates that the first FD-access node 308 has ascertained that congestion is detrimentally affecting the second end node 314, and has sent the second (or fourth) congestion-notification message to the gateway 306. Analogous to the first (or third) congestion-notification message, the second (or fourth) congestion-notification message and/or the CM protocol includes the second bitrate.

In response to the second (or fourth) congestion-notification message, the CM-protocol stack 342 activates a second congestion control for the second flow, as shown in process block 418. As part of activating the second congestion control, the CM-protocol stack 342 obtains the second bitrate and determines the second time period in accordance with the CM protocol. Thereafter, the CM-protocol stack 342 triggers the processor 328 to invoke the queuing engine 340 for any of the second flow received during the second time period.

After being invoked, the queuing engine 340 allocates, re-allocates and/or reserves a portion of the queue 336 for use with the second flow received during the second time period. In addition, the CM-protocol stack 342 instructs the SD interface 326 to transfer any of the second flow it receives during the second time period to the bus 334 for forwarding to the queue 336.

At some point thereafter, the gateway 306 receives a second set of the FD-destined traffic via the SD interface 326, as shown in process block 420. Pursuant to the second congestion control, the SD interface 326 parses the second flow from this second set of the FD-destined traffic, as shown in process block 422.

As an option, the SD interface 326 may relay the remaining portions of the second set of the FD-destined traffic (except for the first flow) to the FD interface 324 for forwarding to the first FD-access node 506, as shown in process block 424. The SD interface 326 may do so in different ways.

Given that the queue 336 may be entirely allocated and reserved, the SD interface 326 may cause the queuing engine 340 to allocate additional portions of the memory 330 or subdivide the queue 336 to create an additional queue (not shown in FIG. 3). Thereafter, the SD interface 326 may cause the queuing engine 340 to accumulate the remaining portions of the second set of the FD-destined traffic to and dequeue such remaining portions from the additional queue. The queuing engine 340 may do so, for example, a rate commensurate with a then current bandwidth capacity between the gateway 306 and the first and/or second FD-access node 308, 310.

As an alternative, the SD interface 326 may pass the remaining portions of the second set of the FD-destined traffic to the bus 334 for forwarding to the FD interface 324 without passing it through the queue 336. As above, the remaining portions of the second set of the FD-destined traffic may be sent to the first FD-access node 308 at a rate commensurate with the speed of the gateway 306.

After being parsed, the queuing engine 340 accumulates the second flow into the queue 336 for the second time period, as shown in process block 426. Like above, the queuing engine 340 instructs the SD interface 326 to transfer the second flow to the bus 334, which in turn, forwards it to the queue 336. The queuing engine 340 may use a time period different from the second time period for accumulating the second flow into the queue 336 to compensate for inherent delays and to prevent undesired latencies.

After the expiration of the first time period, the queuing engine 340 dequeues the first flow from the queue 336 to the FD interface 324 so as to form a dequeued first flow, as shown in process block 428. The queuing engine 340 may dequeue the first flow at a rate to satisfy the first bitrate.

After the expiration of the second time period, the queuing engine 340 dequeues the second flow from the queue 336 to the FD interface 324 so as to form a dequeued second flow, as shown in process block 430. The queuing engine 340 may dequeue the second flow at a rate to satisfy the second bitrate.

After receipt, the FD interface 324 schedules for delivery and sends the dequeued first flow and the dequeued second flow to the first FD-access node 308, as shown in process block 432. After the process block 432, the flow 400 may transition to termination block 434.

At termination block 434 the flow 400 may end. Alternatively, the flow 400 may be repeated periodically, in continuous fashion, or upon being triggered as a result of a condition. Additionally and/or alternatively, a combination of process blocks 404-414, 428 and 432 or a combination of process block 416-426, 430 and 432 may be repeated without repeating the entire flow 400. Further, upon cessation of the congestion, the gateway 306 may supply additional FD-destined traffic ("post-congestion traffic") to the first and/or the second FD-access nodes 308, 310 in the same ways as described above with respect to the pre-congestion traffic.

Although not shown in FIG. 3 or in FIG. 4 and stated otherwise, the SD 304 and the FD 302 may be separate sub-domains that support congestion management separate and apart from each other. To facilitate congestion management between these sub-domains, the gateway 306 (or another gateway coupled thereto) may include another CM-protocol stack that handles congestion management for the SD 304. This way, the gateway 306 (or the other gateway coupled thereto) can be used to minimize or otherwise manage latency per sub-domain given that congestion can also occur in congestion managed domains where longer latency may be experienced. When used between congestion managed domains, the queue 336 may be configured to have storage space at least equal to or larger than the product of bandwidth in bytes per second and round trip delay in seconds of each of the flows.

In addition to being able handle multiple congestion-notification messages received via the FD interface, the gateway 306 may independently send congestion-notification messages to the SD-access node 320, other SD-interconnect and other SD-end nodes based on a current status of the queue 336 and in accordance with the congestion-notification messages it receives from the FD 302.

Although the foregoing describes that the gateway 306 uses a single queue, namely, the queue 336, for all of the first and second flows (and/or the FD-destined traffic), the gateway 306 may also accumulate and dequeue the first and second flows (and/or other flows of the FD-destined traffic) in separate queues ("per-flow queues"). To facilitate proper handling of the first and second flows (and/or other flows of the FD-destined traffic) in respective per-flow queues, the gateway 306 may employ an access control list ("ACL"). The ACL may be arranged to permit the gateway 306 to process the first and second flows (and/or other flows of the FD-destined traffic) in a first-in-first-out manner, for instance.

In addition, the gateway 306 may accumulate and dequeue the first and second flows (and/or other flows of the FD-destined traffic) in terms of hierarchal priority. When, for example, the first and second flows (and/or other flows of the FD-destined traffic) have assigned priorities (e.g., priorities in terms of Quality of Service or "QOS"), then the CM node 306 may accumulate and/or dequeue the first and second flows (and/or other flows of the FD-destined traffic) in accordance with such priorities. While the gateway 306 may use a single queue for processing the first and second flows (and/or other flows of the FD-destined traffic) in terms of the respective priorities, the gateway 306 may accumulate and dequeue such flows in respective per-flow queues. To facilitate the priorities, the gateway 306 may employ the ACL.

In addition, the gateway 306 may employ the CM-protocol stack 342 to adaptively add or modify respective tags of the first and/or second flows for traffic classification and management. These first-flow and second-flow tags may be, for example, Ethernet virtual-local-area network ("VLAN") tags, Multiprotocol Label Switching ("MPLS") tags, or tags that distinguish one of the types of data traffic from another. The tags may also include priority information to facilitate preferred queuing treatment.

The CM-protocol stack 342 may maintain a mapping between tags and traffic types in which the mapping may be adapted to any technical or non-technical objectives. For example, the tags may be mapped to static traffic information from L2, L3, and/or L4 headers. This allows partitioning of network resources based on different types of traffic flows, including block storage traffic, such as (FCoE, iSCSI); file access traffic, such as (NFS/parallel NFS); database traffic; RDMA traffic; real-time network traffic; and web traffic. The gateway 306 may use the mapping for the generating and/or maintaining the ACL.

As another example, the tags may be mapped to one or more service-level agreement ("SLAs") and/or other traffic condition. Using this mapping, the gateway 306 may reduce allocated bandwidth for latency bounded traffic flows, as the SLA allows. Alternatively, the gateway 306 may use an aggressive rate adaptation algorithm so that a depth of the queue 336 can be bounded based the SLAs. As yet another example, the tags may be mapped to traffic loading. Using this mapping, the gateway 306 may use packet reordering to satisfy such traffic loading. To carry this out, the gateway 306 may use a portion of the queue 336 to rearrange frame order of the first and second flows so as to satisfy the traffic loading.

Example Alternative Architecture

Figure 5:
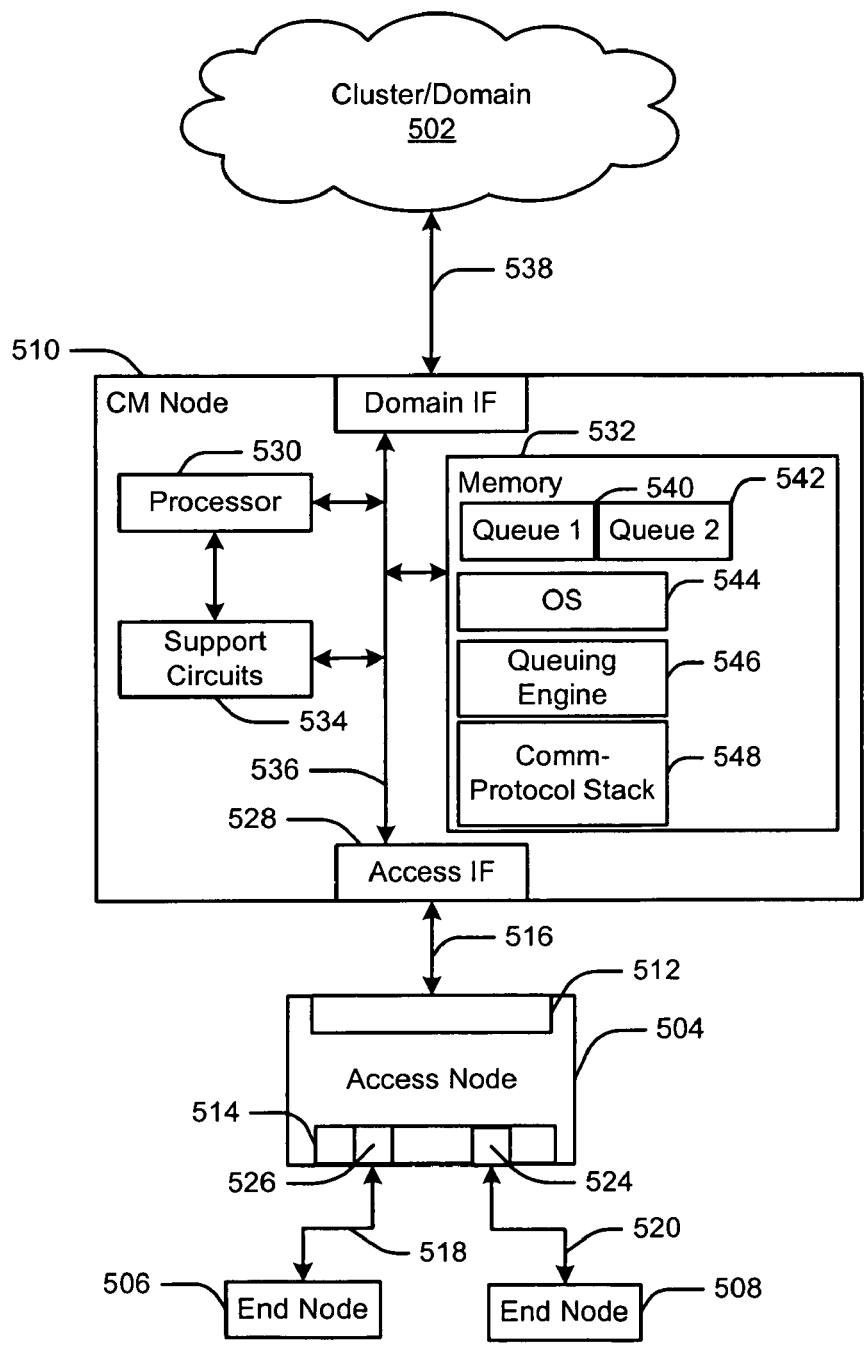
FIG. 5 is a block diagram illustrating a third network in accordance with one or more aspects of the technology.

FIG. 5 is a block diagram illustrating an example network 500 in accordance with one or more aspects of the technology. The network 500 may be, for example, a segment of a larger computer cluster network or domain 502. The network 500 may include an access node 504, first and second end nodes 506, 508 and a CM node 510.

The first and second end nodes 506, 508 may be, for example, servers or other computers. The first and second end nodes 506, 508 may communicate using any of a standardized, proprietary, open-source, and freely-available communication protocol for communicating in packet data networks and the like. For example, the first and second end node nodes 506, 508 may communicate using one or more of the IEEE 802.3 standards, including any of the Fast Ethernet, GE and 10GE protocols. Accordingly, the first and second end nodes 506, 508 may include or have assigned thereto first and second addressed, respectively. These first and second "end node" addresses may be, for example, Internet Protocol ("IP") addresses and/or Medium Access Control ("MAC") addresses.

The access node 504 may be a network interconnect node, such as a network switch, bridge, etc. As such, the access node 504 may include two interfaces 512, 514. The access node 504 may use its first interface ("CM-facing interface") 512 for communicating with the CM node 510 via link 516.

The access node 504 may use its second interface ("end-node-access interface") 514 for communicating with the first and second end nodes 506, 508 via the links 518, 520. The end-node-access interface 514 may include first and second ports 522, 524 that are mapped to first and second end node addresses, respectively. To facilitate communication with the first and second end nodes 506, 508, the end-node-access interface 514 may communicate using one or more of the IEEE 802.3 standards, including any of the Fast Ethernet, GE and 10GE protocols.

The CM-facing interface 512 may employ the GE or 10EG protocols for full-duplex communication. As such, the CM-facing interface 512 may provide to the CM node 510 flow control messages. For example, the CM-facing interface 512 may send to the CM node 510 a first PAUSE message in accordance with IEEE 802.3x when the end-node-access interface 514 detects congestion that detrimentally affects communication with the first end node 506. Alternatively, the CM-facing interface 512 may send to the CM node 510 a first Priority PAUSE message in accordance with IEEE 802.1bb when the end-node-access interface 514 detects congestion that detrimentally affects communication with the first end node 506.

The CM-facing interface 512 may also send to the CM node 510 a second PAUSE message in accordance with IEEE 802.3x when the end-node-access interface 514 detects congestion that detrimentally affects communication with the second end node 508. Alternatively, the CM-facing interface 512 may send to the CM node 510 a second Priority PAUSE message in accordance with IEEE 802.1bb when the end-node-access interface 514 detects congestion that detrimentally affects communication with the second end node 508.

The CM node 510 may include a domain interface 526, access interface 528, processor 530, memory 532, support circuits 534 and bus 536. The domain interface 526 may communicatively couple with the cluster domain 502 via link 538.

The domain interface 526 may control one or more exchanges of the data traffic destined for the first and/or second end nodes 506, 508 (hereinafter "end-node-destined traffic") the cluster domain 502 and the bus 536. The end-node-destined traffic may include first and second flows. The first flow ("first-end-node flow") may include one or more packets that are addressed to the first end node 506. The second flow ("second-end-node flow") may include one or more packets that are addressed to the second end node 508. To facilitate communication with and receive the end-node-destined traffic from the cluster domain 502, the domain interface 526 may employ the GE or 10EG protocols for full-duplex communication.

The access interface 528 may be configured to communicatively couple with the access node 504 via the link 516. The access interface 528 may control one or more exchanges of the end-node-destined traffic between the access node 504 and the bus 536. To facilitate this, the access interface 536 may employ the GE and 10GE protocols for full duplex communication.

The processor 530 may be one or more conventional processors, microprocessors, multi-core processors and/or microcontrollers. The bus 536 may be configured to provide one or more transmissions of digital information among the domain interface 526, access interface 528, processor 530, memory 532 and support circuits 534. The support circuits 534 may be configured to facilitate one or more operations of the processor 530. The support circuits 560 may include well-known circuitry or circuits, including, for example, one or more I/O interfaces, cache, clock circuits, power supplies and the like.

The memory 534 may be or employ any of random access memory, read-only memory, optical storage, magnetic storage, removable storage, erasable programmable read only memory and variations thereof, content addressable memory and variations thereof, flash memory, disk drive storage, removable storage and the like. The memory 532 may include first and second queues 540, 542. These first and second queues 540, 542 may be persistently allocated or, alternatively, may be allocated and de-allocated on-the-fly.

The first queue 540 may store one or more packets of first-end-node flow. The second queue 542 may store one or more packets of the second-end-node flow.

The memory 532 may also store, and receive one or more queries from the processor 530 to obtain for execution, an operating system 544 and various executable modules, including a queuing engine 546 and a communication-protocol stack 548. As executable modules, each of the queuing engine 546 and communication-protocol stack 548 may include directives, which may be implemented in hardware, firmware and/or software. Under execution by the processor, the operating system 544 may provide a platform onto which the queuing engine 546 and the communication-protocol stack 548 may be executed.

The communication-protocol stack 548 may configure the CM node 510 to apply the communication protocol to the end-node-destined traffic received via the domain interface 526. For example, the communication-protocol stack 548 may configure the processor 530 to execute the queuing engine 546 in response to receiving any of the first PAUSE message, first Priority PAUSE message, second PAUSE message and the second Priority PAUSE message.

The queuing engine 546, in turn, may configure the CM node 510 to accumulate the first-end-node flow into and/or dequeue the first-end-node flow from the first queue 540 in response to the first PAUSE message and/or first Priority PAUSE message. For example, the queuing engine 546 may configure the processor 530 to accumulate the first-end-node flow into and dequeue the first-end-node flow from the first queue 540 to carry out a pause and resume of delivery of the first-end-node flow.

The queuing engine 546 may also configure the CM node 510 to accumulate the second-end-node flow into and/or dequeue the second-end-node flow from the second queue 542 in response to the second PAUSE message and/or second Priority PAUSE message. For example, the queuing engine 546 may configure the processor 530 to accumulate the second-end-node flow into and dequeue the second-end-node flow from the second queue 542 to carry out a pause and resume of delivery of the second-end-node flow.

Example Flow-Control

Figure 6:
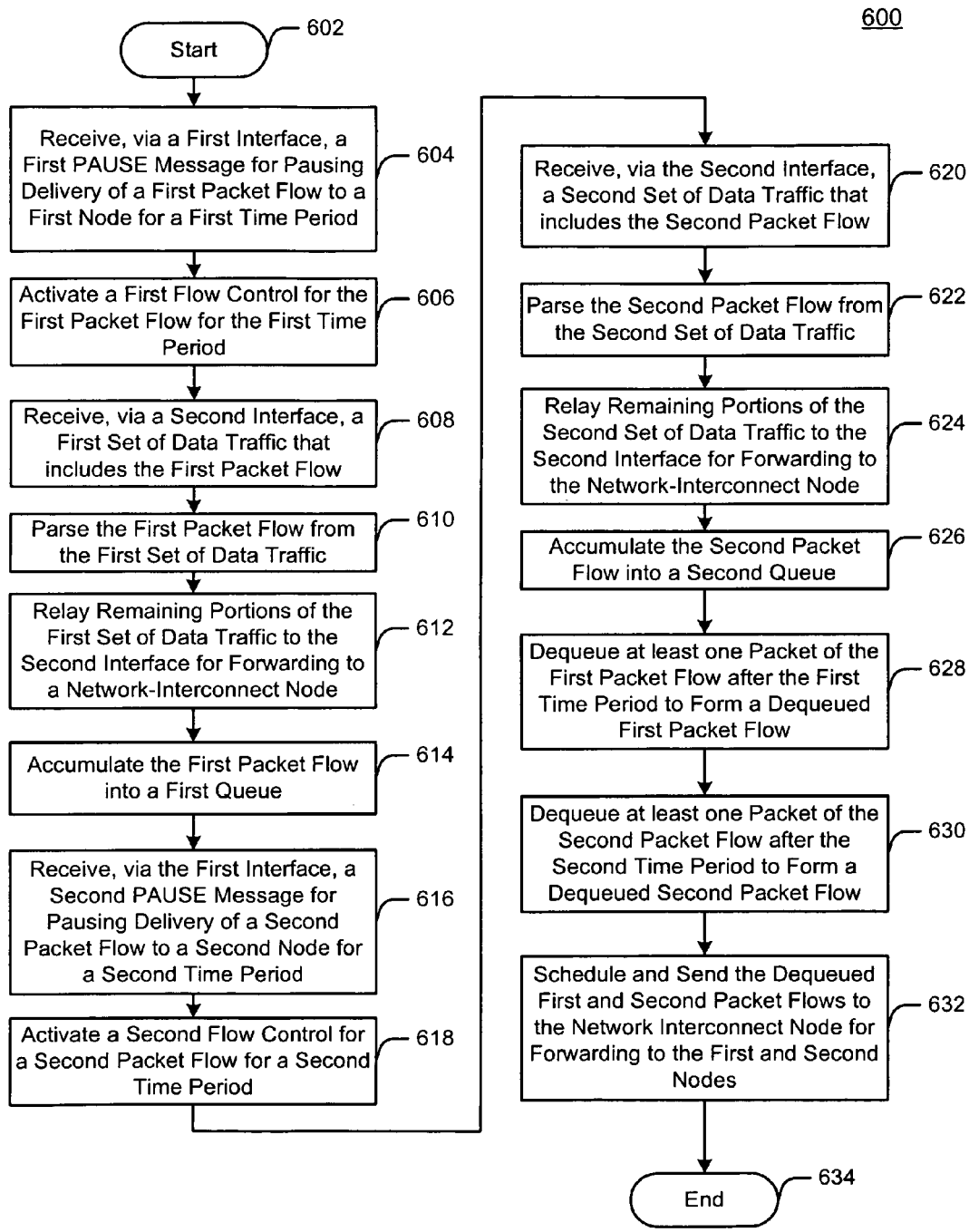
FIG. 6 is a flow diagram illustrating a third example flow for performing congestion management.

FIG. 6 is a flow diagram illustrating an example flow 600 for performing congestion management. For convenience, the following describes the flow 600 with reference to operation of the CM node 510 of FIG. 5. The flow 600 may be carried out using other architectures as well.

Prior to an initiation of the flow 600 at process block 602, the CN node 510 becomes operative, such that the operating system 544, queuing engine 546 and communication-protocol stack 548 are retrieved from the memory 532 and executed by the processor 530. As such, the CM node 510 functions as a specially programmed computer for carrying out any of the functions noted above and below. Any reference below to the queuing engine 546 and communication-protocol stack 548 assumes that they and the directives therein are under execution by the processor 530.

Also prior to the initiation of the flow 600, the access node 504 has not detected that congestion is detrimentally affecting either of the first and second end nodes 506, 508. As such, the CM node 510 relays to the access node 504 any of the end-node-destined traffic it receives from cluster domain 502 (i.e., the pre-congestion traffic). The CM node 510 may relay the pre-congestion traffic to the access node 504 in different ways.

For instance, the CM node 510 may invoke the queuing engine 546 for the pre-congestion traffic. After being invoked, the queuing engine 546 allocates and/or reserves any of the first and/or second queues 540, 542 for use with the pre-congestion traffic. In addition, the queuing engine 546 instructs the domain interface 526 to transfer any of the pre-congestion traffic to the bus 536 for forwarding to the first and/or second queues 540, 542. The queuing engine 546 may accumulate the pre-congestion traffic to and dequeue the pre-congestion traffic from the first and/or second queues 540, 542 a rate commensurate with a then current bandwidth capacity between the CM node 510 and the access node 504.

As an alternative, the CM node 510 may cause domain interface 526 to pass the pre-congestion traffic to the bus 536 for forwarding to the access interface 528 without passing through either of the first or second queues 540, 542. This way, the CM node 510 may send the pre-congestion traffic to the access node 504 at a rate commensurate with a given speed of the CM node 510.

At some point in time, the access node 504 detects that congestion is detrimentally affecting the first end node 506, and responsively sends the first PAUSE message to the CM node 510 via the CM-facing interface 512. In accordance with the IEEE 802.3x standard, the first PAUSE message includes a first time period for pausing the delivery of the first-end-node flow.

At some point in time after initiation of the flow 600 at termination block 602, the CM node 510 receives the first PAUSE message at its access interface 528, as shown in process block 604. Responsively, the communication-protocol stack 548 activates a first flow control for the first-end-node flow for the first time period, as shown in process block 606.

As part of activating the first flow control, the communication-protocol stack 548 triggers the processor 530 to invoke the queuing engine 546 for any of the first-end-node flow received during the first time period. After being invoked, the queuing engine 546 allocates, re-allocates and/or reserves the first queue 540 for use with the first-end-node flow received during the first time period. In addition, the communication-protocol stack 548 instructs the domain interface 526 to transfer any of the first-end-node flow it receives during the first time period to the bus 536 for forwarding to the first queue 540.

At some point thereafter, the CM node 510 receives a first set of the end-node-destined traffic via the domain interface 526, as shown in process block 608. Pursuant to the first flow control, the domain interface 526 parses the first-end-node flow from this first set of the end-node-destined traffic, as shown in process block 610.

As an option, the domain interface 526 may relay the remaining portions of the first set of end-node-destined traffic to the access interface 528 for forwarding to the access node 506, as shown in optional process block 612. As above, the domain interface 526 may relay the remaining portions of the first set of end-node-destined traffic to the access interface 528 in different ways. The domain interface 526 may, for example, cause the queuing engine 546 to accumulate the remaining portions of the first set of end-node-destined traffic to and dequeue such remaining portions from the second queue 542. The queuing engine 546 may do so, for example, a rate commensurate with a then current bandwidth capacity between the CM node 510 and the access node 504 for such traffic.

Alternatively, the domain interface 526 may pass the remaining portions of the first set of the end-node-destined traffic to the bus 536 for forwarding to the access interface 528 without passing it through the second queue 542. As above, the remaining portions of the first set of the end-node-destined traffic may be sent to the access node 504 at a rate commensurate with the speed of the CM node 510.

After being parsed, the queuing engine 546 accumulates the first-end-node flow into the first queue 540 for the first time period, as shown in process block 614. To carry this out, the queuing engine 546 instructs the domain interface 526 to transfer the first-end-node flow to the bus 536, which in turn, forwards it to the first queue 540. Due to inherent delays in communications and processing, the queuing engine 546 may accumulate the first-end-node flow into the first queue 540 for a time period less than the first time period. Such time period may be less to compensate for the inherent delays and to prevent undesirable latencies.

Prior to the expiration of the first time period, the CM node 510 receives the second PAUSE message at its access interface 528, as shown in process block 616. Reception of the second PAUSE message, as above, indicates that the access node 504 has detected that congestion is detrimentally affecting the second end node 508, and has sent the second PAUSE message to the CM node 510 via the CM-facing interface 512.

The second PAUSE message includes a second time period for pausing the delivery of the second-end-node flow.

In response to the second PAUSE message, the communication-protocol stack 548 activates a second flow control for the second-end-node flow, as shown in process block 618. As part of activating the second flow control, the communication-protocol stack 548 triggers the processor 530 to invoke the queuing engine 546 for any of the second-end-node flow received during the second time period.

After being invoked, the queuing engine 546 allocates, re-allocates and/or reserves the second queue 542 for use with the second-end-node flow received during the second time period. In addition, the communication-protocol stack 548 instructs the domain interface 526 to transfer any of the second-end-node flow it receives during the second time period to the bus 536 for forwarding to the second queue 542.

At some point thereafter, the CM node 510 receives a second set of the end-node-destined traffic via the domain interface 526, as shown in process block 620. Pursuant to the second flow control, the domain interface 526 parses the second-end-node flow from this second set of the end-node-destined traffic, as shown in process block 622.

As an option, the domain interface 526 may relay the remaining portions of the second set of the end-node-destined traffic (except the first-end-node flow) to the access interface 528 for forwarding to the access node 506, as shown in process block 624. The domain interface 526 may do so in different ways.

Given that the first and second queues 540, 542 are allocated and reserved, the domain interface 526 may cause the queuing engine 546 to allocate additional portions of the memory 532 or subdivide any of the first and second queues 540, 542 to create an additional queue (not shown in FIG. 5). Thereafter, the domain interface 526 may cause the queuing engine 546 to accumulate the remaining portions of the second set of the end-node-destined traffic to and dequeue such remaining portions from the additional queue. The queuing engine 546 may do so, for example, at a rate commensurate with a then current bandwidth capacity between the CM node 510 and the access node 504 for such traffic.

The domain interface 526, as an alternative, may pass the remaining portions of the second set of the end-node-destined traffic to the bus 536 for forwarding to the access interface 528 without passing it through the second queue 542. As above, the remaining portions of the second set of the end-node-destined traffic may be sent to the access node 504 at a rate commensurate with the speed of the CM node 510.

After being parsed, the queuing engine 546 accumulates the second-end-node flow into the second queue 542 for the second time period, as shown in process block 626. As similar to above, the queuing engine 546 instructs the domain interface 526 to transfer the second-end-node flow to the bus 536, which in turn, forwards it to the second queue 542. The queuing engine 546 may use a time period different from the second time period for accumulating the second-end-node flow into the second queue 542 to compensate for inherent delays and to prevent undesired latencies.

After the expiration of the first time period, the queuing engine 546 dequeues the first-end-node flow from the first queue 540 to the access interface 528 so as to form a dequeued first-end-node flow, as shown in process block 628. The queuing engine 546 may dequeue the first-end-node flow at a rate commensurate with a then current bandwidth capacity between the CM node 510 and the access node 504. The queuing engine 546 may dequeue the first-end-node flow at other rates as well.

After the expiration of the second time period, the queuing engine 546 dequeues the second-end-node flow from the second queue 542 to the access interface 528 so as to form a dequeued second-end-node flow, as shown in process block 630. Like the dequeued first-end-node flow, the queuing engine 546 may dequeue the second-end-node flow at a rate commensurate with a then current bandwidth capacity between the CM node 510 and the access node 504. The queuing engine 546 may dequeue the second-end-node flow at other rates as well.

After receipt, the access interface 528 schedules for delivery and sends the dequeued first-end-node traffic and the dequeued second-end-node traffic to the access node 504, as shown in process block 632. After process block 632, the flow 600 may transition to termination block 634.

At termination block 634 the flow 600 may end. Alternatively, the flow 600 may be repeated periodically, in continuous fashion, or upon being triggered as a result of a condition. Additionally and/or alternatively, the combination of process blocks 604-614, 628 and 632 or the combination of process block 616-626, 630 and 632 may be repeated without repeating the entire flow 600. Further, upon cessation of the congestion, the CM node 510 may supply additional end-node-destined traffic ("post-congestion traffic") to the access node 504 in the same ways as described above with respect to the pre-congestion traffic.

In addition, the CM node 510 may accumulate and dequeue the first and second end node flows (and/or other flows of the end-node-destined traffic) in terms of hierarchal priority, including as for example described above with respect to the gateway 306 of FIG. 3. Given that the first bitrate may be slower than the second bitrate or that the first and second bitrates may be set to minimize or maximize sizes of the first and second queues 540, 542, respectively, the CM node 510 may employ an ACL (not shown in FIG. 5) to enable the CM node 510 to satisfy the priorities.

Alternative Example Flow-Control

Figure 7:
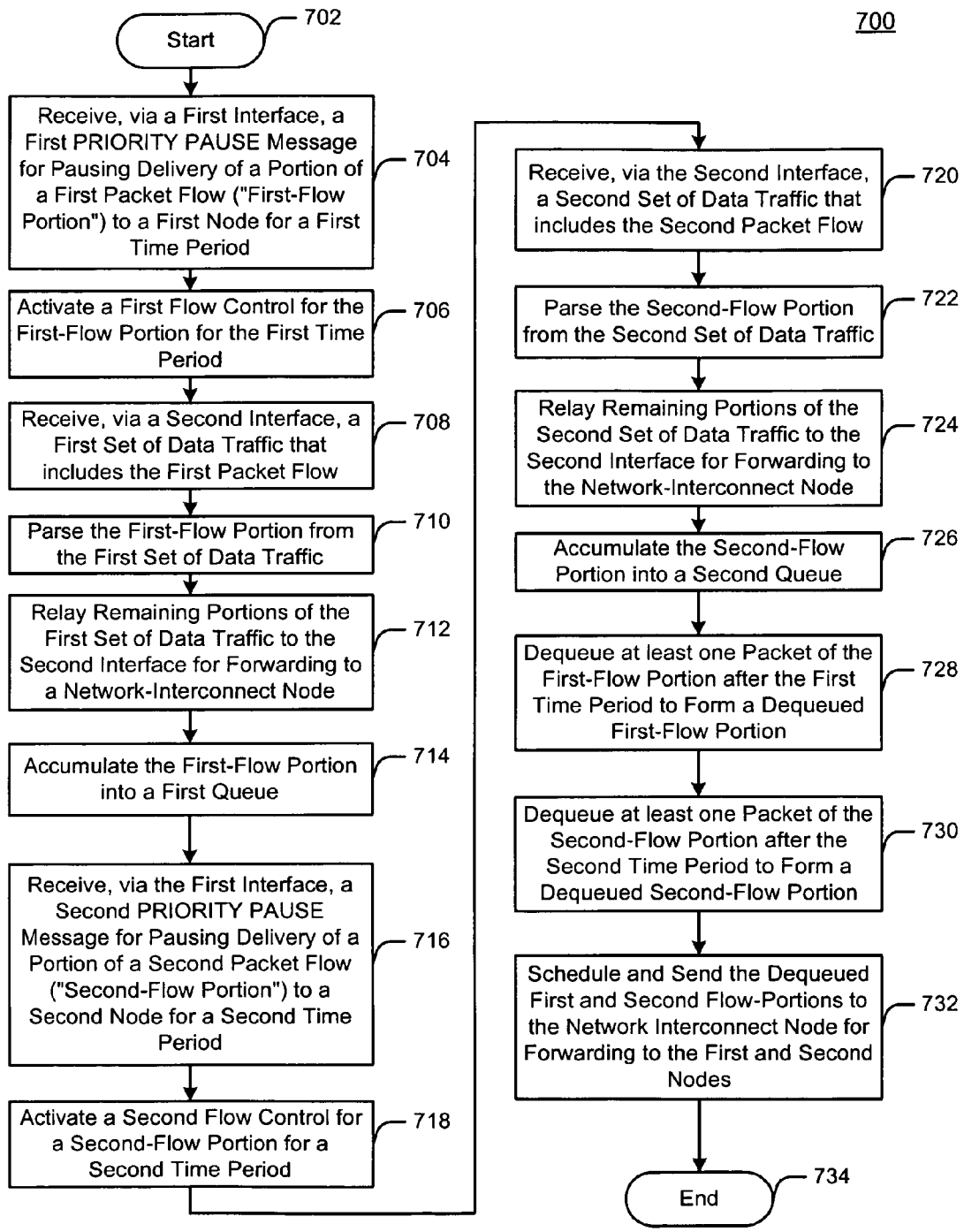
FIG. 7 is a flow diagram illustrating a fourth example flow for performing congestion management.

FIG. 7 is a flow diagram illustrating another example flow 700 for performing congestion management. For convenience, the following describes the flow 700 with reference to operation of the CM node 510 of FIG. 5. The flow 700 may be carried out using other architectures as well.

Prior to an initiation of the flow 700 at process block 702, the CN node 510 becomes operative, such that the operating system 544, queuing engine 546 and communication-protocol stack 548 are retrieved from the memory 532 and executed by the processor 530. As such, the CM node 510 functions as a specially programmed computer for carrying out any of the functions noted above and below. Any reference below to the queuing engine 546 and communication-protocol stack 548 assumes that they and the directives therein are under execution by the processor 530.

Also prior to the initiation of the flow 700, the access node 504 has not detected that congestion is detrimentally affecting either of the first and second end nodes 506, 508. As such, the CM node 510 relays pre-congestion traffic to the access node 504. The CM node 510 may relay the pre-congestion traffic to the access node 504 in different ways, including the ways noted above.

At some point in time, the access node 504 detects that congestion is detrimentally affecting the first end node 506, and responsively sends the first Priority PAUSE message to the CM node 510 via the CM-facing interface 512. In accordance with the IEEE 802.1bb standard, the first Priority PAUSE message defines, by a QOS hierarchy, a first list of one or more types of packets (e.g., video and telephonic packets) to send for a first time period.

After initiation of the flow 700 at termination block 702, the CM node 510 receives the first Priority PAUSE message at its access interface 528, as shown in process block 704. Responsively, the communication-protocol stack 548 activates a first flow control for a first portion of the first-end-node flow ("first-flow portion") for the first time period, as shown in process block 706. This first-flow portion includes one or more portions of the first-end node flow that are absent from the first list.

As part of activating the first flow control, the communication-protocol stack 548 triggers the processor 530 to invoke the queuing engine 546 for any of the first-flow portion received during the first time period. After being invoked, the queuing engine 546 allocates, re-allocates and/or reserves the first queue 540 for use with the first-flow portion received during the first time period. In addition, the communication-protocol stack 548 instructs the domain interface 526 to transfer the first-flow portion that it receives during the first time period to the bus 536 for forwarding to the first queue 540.

At some point thereafter, the CM node 510 receives a first set of the end-node-destined traffic via the domain interface 526, as shown in process block 708. Pursuant to the first flow control, the domain interface 526 parses the first-flow portion from this first set of the end-node-destined traffic, as shown in process block 710.

As an option, the domain interface 526 may relay the remaining portions of the first set of end-node-destined traffic to the access interface 528 for forwarding to the access node 506, as shown in optional process block 712. As above, the domain interface 526 may relay the remaining portions of the first set of end-node-destined traffic to the access interface 528 in different ways, including those noted above with respect to process block 612 (FIG. 6).

After being parsed, the queuing engine 546 accumulates the first-flow portion into the first queue 540 for the first time period, as shown in process block 714. To carry this out, the queuing engine 546 instructs the domain interface 526 to transfer the first-flow portion to the bus 536, which in turn, forwards it to the first queue 540. The queuing engine 546 may, alternatively, use a time period different from the first time period for accumulating the first-flow portion into the first queue 540 so as to compensate for the inherent delays and to prevent undesired latencies.

Prior to the expiration of the first time period, the CM node 510 receives the second Priority PAUSE message at its access interface 528, as shown in process block 716. Reception of the second Priority PAUSE message, as above, indicates that the access node 504 has detected that congestion is detrimentally affecting the second end node 508, and has sent the second Priority PAUSE message to the CM node 510 via the CM-facing interface 512. In accordance with the IEEE 802.1bb standard, the second Priority PAUSE message defines, by the QOS hierarchy, a second list of one or more types of packets to send for a second time period.

In response to the second Priority PAUSE message, the communication-protocol stack 548 responsively activates a second flow control for a second portion of the second-end-node flow ("second-flow portion") for the second time period, as shown in process block 718. The second-flow portion includes one or more portions of the second-end node flow that are absent from the second list.

As part of activating the second flow control, the communication-protocol stack 548 triggers the processor 530 to invoke the queuing engine 546 for any of the second-flow portion received during the second time period. After being invoked, the queuing engine 546 allocates, re-allocates and/or reserves the second queue 542 for use with the second-flow portion received during the second time period. In addition, the communication-protocol stack 548 instructs the domain interface 526 to transfer the second-flow portion it receives during the first time period to the bus 536 for forwarding to the second queue 542.

At some time thereafter, the CM node 510 receives a second set of the end-node-destined traffic via the domain interface 526, as shown in process block 720. Pursuant to the second flow control, the domain interface 526 parses the second-flow portion from this second set of the end-node-destined traffic, as shown in process block 722.

As an option, the domain interface 526 may relay the remaining portions of the second set of the end-node-destined traffic to the access interface 528 for forwarding to the access node 506, as shown in process block 724. The domain interface 526 may do so in different ways, including the ways noted above with respect to the process block 624 (FIG. 6).

After being parsed, the queuing engine 546 accumulates the second-flow portion into the second queue 542 for the second time period, as shown in process block 726. As similar to above, the queuing engine 546 instructs the domain interface 526 to transfer the second-flow portion to the bus 536, which in turn, forwards it to the second queue 542. The queuing engine 546 may use a time period different from the second time period for accumulating the second-flow portion into the second queue 542 to compensate for inherent delays and to prevent undesired latencies.

After the expiration of the first time period, the queuing engine 546 dequeues the second-flow portion from the first queue 540 to the access interface 528 so as to form a dequeued first-flow portion, as shown in process block 728. The queuing engine 546 may dequeue the first-flow portion at a rate commensurate with a then current bandwidth capacity between the CM node 510 and the access node 504. The queuing engine 546 may dequeue the first-flow portion at other rates as well.

After the expiration of the second time period, the queuing engine 546 dequeues the second-flow portion from the second queue 542 to the access interface 528 so as to form a dequeued second-flow portion, as shown in process block 730. The queuing engine 546 may dequeue the second-flow portion at a rate commensurate with a then current bandwidth capacity between the CM node 510 and the access node 504. The queuing engine 546 may dequeue the second-flow portion at other rates as well.

After receipt, the access interface 528 schedules for delivery and sends the dequeued first-flow portion and the dequeued second-flow portion to the access node 504, as shown in process block 732. After process block 732, the flow 700 may transition to termination block 734.

At termination block 734 the flow 700 may end. Alternatively, the flow 700 may be repeated periodically, in continuous fashion, or upon being triggered as a result of a condition. Additionally and/or alternatively, the combination of process blocks 704-714, 728 and 732 or the combination of process block 716-726, 730 and 732 may be repeated without repeating the entire flow 700. Further, upon cessation of the congestion, the CM node 510 may supply additional end-node-destined traffic ("post-congestion traffic") to the access node 504 in the same ways as described above with respect to the pre-congestion traffic.

Although not shown in FIG. 5, the CM node 510 may employ an ACL to enable the CM node 510 to satisfy the QOS priorities for the Priority PAUSE messaging. And although not shown in FIG. 6 or FIG. 7, the CM node 510 and/or the queuing engine 546 may support providing PAUSE and/or Priority PAUSE messaging on the domain interface 526. This way, the CM node 510 and/or the queuing engine 546 may propagate such messages when the first and/or second queues 540, 542 run out of space or when a current state of the memory 530 cannot support additional queues. By using the Priority PAUSE messaging for packets having priorities falling within a lower portion of the QOS hierarchy.

Referring again to FIG. 1, the ingress interface 120 may be configured to receive the FD-destined traffic at a first rate. For example, the ingress interface 120 may receive the data traffic in accordance with 10GE. The egress interface 122, however, may be configured to send the FD-destined traffic at a second rate that is less than the first rate. For example, the egress interface 120 may send the data traffic at a rate in accordance with Fast Ethernet and/or GE. As such, the CM node 106 may be configured to rate limit the FD-destined traffic, in accordance with the flow 200 of FIG. 2.

Additionally and/or alternatively, the ingress interface 120 may be than one physical interface; each and/or the total of which may receive FD-destined traffic a rate greater than the second rate. As such, the CM node 106 may be configured to rate limit the FD-destined traffic, in accordance with the flow 200 of FIG. 2. To facilitate load balancing, the CM node 106 may employ a protocol, such as Link Aggregation Control Protocol ("LACP"). In accordance with the LACP, the CM node 106 may configure the ingress interface 120 as a single logical interface to share load across the physical interfaces.

In any of the foregoing embodiments, when the queue or queues run out of space or when a current state of the memory cannot support additional queues, the CM node 106, gateway 306, CM node 510 and/or the queuing engines thereof may drop packets or send flow control message to the receiving interface(s) of such nodes. The CM node 106, gateway 306, CM node 510 and/or the queuing engines thereof may selectively drop received packets using RED, for instance.

In accordance with one or more aspects of the technology, example architecture of another CM node 800 is substantially shown in FIGS. 8A-8E. The CM node 800 may include a field programmable gate array ("FPGA") 802 along with two busses ("first and second processor-I/O busses") 804, 806 that communicatively couple to a processor (not shown). The CM node 800 may also include first and second memories 808, 810 and two busses ("first-memory and second-memory busses") 812, 814 that communicatively couple to the first and second memories 808, 810, respectively.

The FPGA 802 may include an ingress interface 816, an egress interface 818, a queuing engine 820, a first data path 822, a second data path 824, a third data path 826, a fourth data path 828, first and second I/O interfaces 831, 833 and a memory ("FPGA-memory") 862. The FPGA-memory 862 may also include a free-list buffer 858 and a packet-length-list buffer 860.

The first and second I/O interfaces 831 and 833 communicatively couple with the processor via the first and second processor-I/O busses 804, 806, respectively. The first I/O interface 831 may be an I2C interface, and the second I/O interface 833 may be a PPC local bus interface.

The first data path 822 may define a first series of links that interconnects the ingress interface 816 to the queuing engine 820. The second data path 824 may define a second series of links that interconnects the queuing engine 820 to the egress interface 818. The third data path 826 may define a third series of links that interconnects the ingress interface 816 and egress interface 818. The fourth data path 828 may define a fourth series of links that interconnects queuing engine 820 with the egress interface 818.

The ingress interface 816 may communicatively couple with and control an ingress port (not shown). To facilitate such control, the ingress-interface controller 816 may include a gigabit media independent interface ("GMII") 830. This "ingress" GMII 830 may be, for example, a 10 Gigabit Media Independent Interface ("XGMII") or, alternatively, a XAUI. The ingress-interface 816 may also include an ingress stack 832 that communicatively couples with the ingress GMII 830. The ingress stack 832 may be formed in accordance with a MAC protocol for 10 Gigabit Ethernet ("10GE").

The first memory 808 may be, include or employ random access memory ("RAM"), such as RLDRAM, PBSRAM, DDR SRAM and the like. The first memory 808 may define a plurality of queues $811_i \ldots 811_n$. The plurality of queues $811_i \ldots 811_n$ may be mapped to destination IP addresses of a respective plurality of nodes (not shown). The first memory 808 may be subdivided into a number of blocks. For example, the second memory 810 may be subdivided into 64 k blocks; each of which may be 2 k bytes.

Each of the plurality of queues $811_i \ldots 811_n$ may be allocated a number of the blocks. This number of blocks may have a given maximum value ("maximum-block allocation"), which may be software programmable. The packet-length list buffer 858 may store length of the packet that is in each of the blocks allocated to each of the plurality of queues $811_i \ldots 811_n$.

In addition, each of the blocks may be identified by a buffer pointer. The free-list buffer 858 may store a list that tracks, by the buffer pointers, all of the blocks not allocated to one of the plurality of queues $811_i \ldots 811_n$.

The second memory 810 may define an allocation table that tracks the blocks allocated to each of the plurality of queues $811_i \ldots 811_n$. To facilitate this, the first memory 808 may be, include or employ RAM, such as pipeline-burst-static RAM ("PBSRAM"), double-data-rate synchronous dynamic random access memory ("DDR SRAM") and the like.

The queuing engine 820 may include an ingress processor 834, a queue manager 836, an output scheduler 838 and an egress processor 840. Details of the ingress processor 834, queue manager 836, output scheduler 838 and egress processor 840 are described below with respect to FIGS. 8B-8E.

The egress interface 818 may communicatively couple with and control an egress port (not shown). The egress interface 818 may include an ("egress") GMII 844 to facilitate control of the egress port. The egress GMII 844 may be, for example, an XGMII or, alternatively, a XAUI. The egress interface 818 may also include egress stack 842 that communicatively couples with the egress GMII 844. Like the ingress stack 832, the egress stack 844 may be formed in accordance with a MAC protocol for 10GE.

Figure 8A:
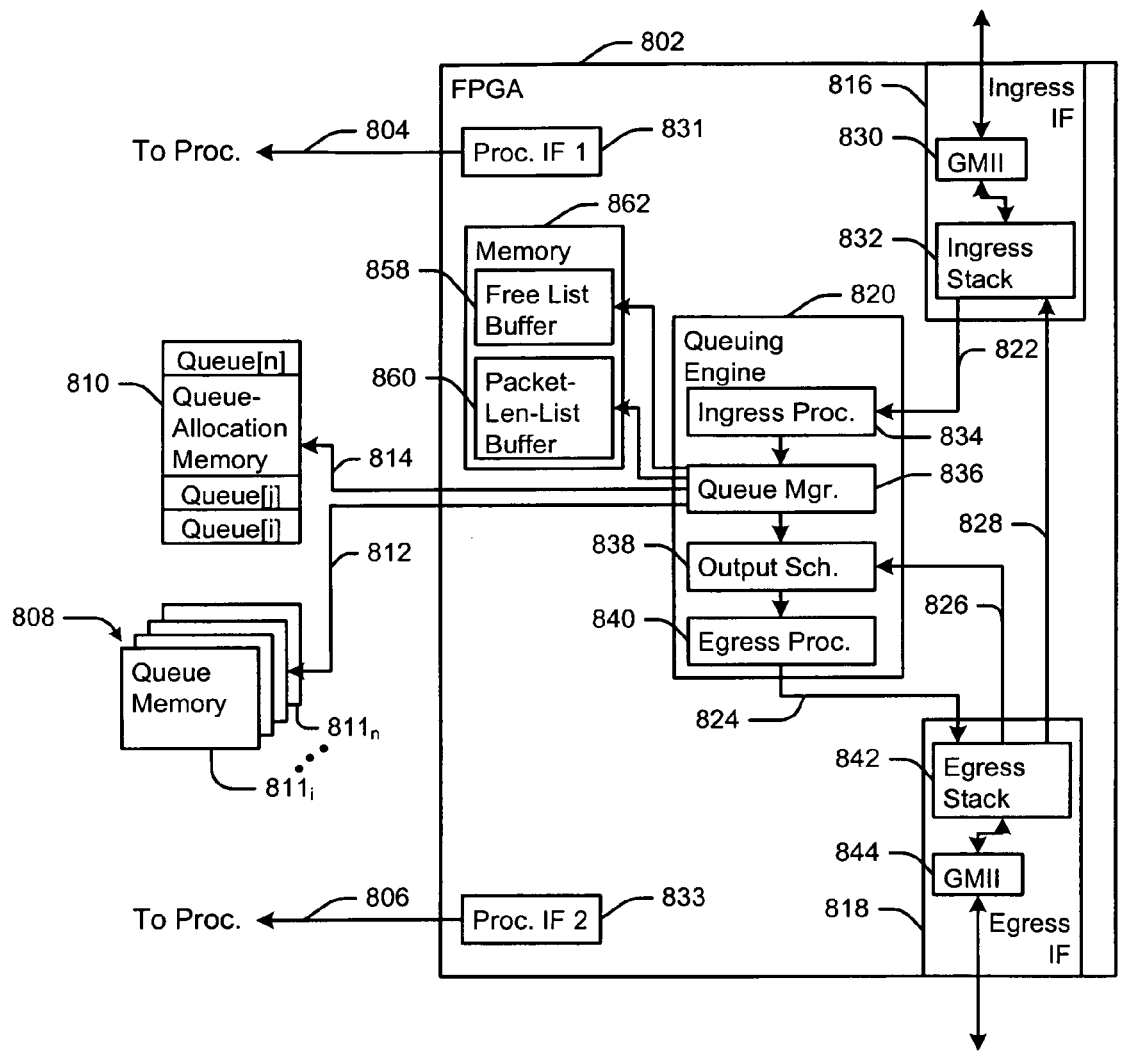
FIGS. 8A-8E are block diagrams illustrating example architecture of a congestion-management node.
Figure 8B:
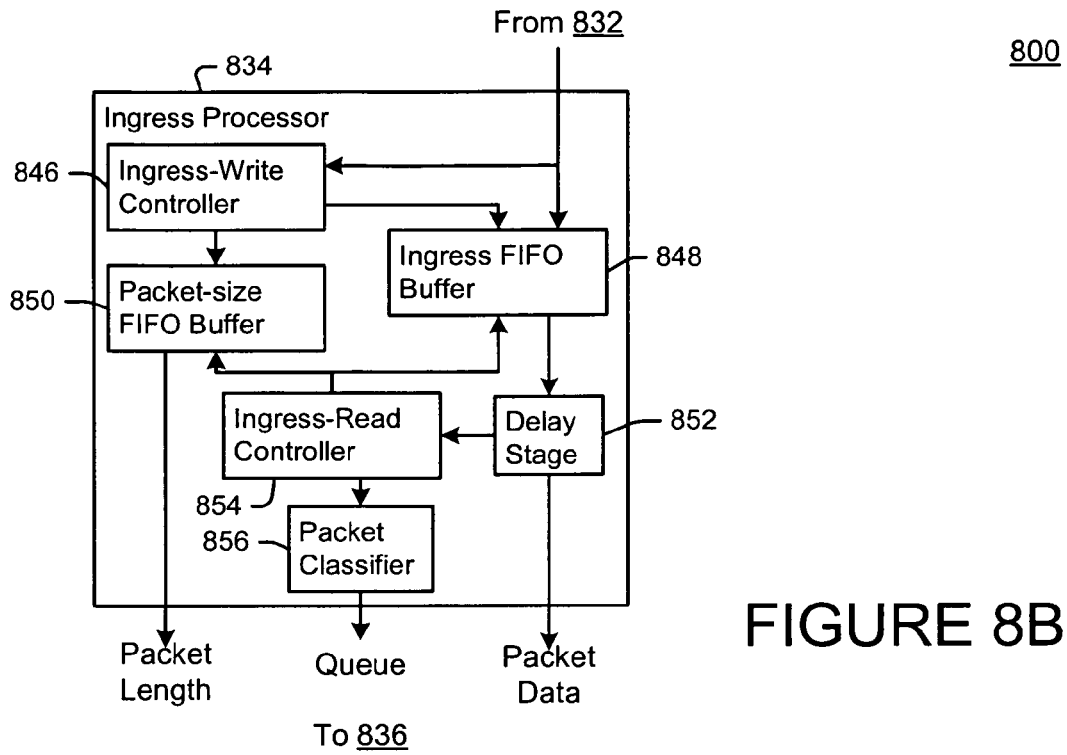

The ingress processor 834 may communicatively couple with the ingress interface 816 and the queue manager 836. With reference now to FIG. 8B, the ingress processor 834 may include an ingress-write controller 846, an ingress FIFO buffer 848, a packet-size FIFO buffer 850, delay stage 852, an ingress-read controller 854 and a packet classifier 856.

Each of the ingress-write controller 846 and the ingress FIFO buffer 848 may communicatively couple and receive data packets from the ingress stack 832. Given that the egress stack 844 sends each packet as a stream (and not store and forward), the ingress-write controller 846 may monitor the stream for a CRC error so to determine an end and a length ("packet length") of such packet. The ingress FIFO buffer 848 may accumulate the bits of the packet in a first-in-first-out manner. The ingress-write controller 846, after determining that the ingress FIFO buffer 848 received the entire packet, may pass the packet length to the packet-size FIFO buffer 850. In addition, the ingress-write controller 846 may notify the ingress-read controller 854 that ingress FIFO buffer 848 contains the entire packet.

The ingress-read controller 854 may, in response, tread the packet from the ingress FIFO buffer 848 to the queue manager 836 via the delay stage 852. The ingress-read controller 854 uses the delay stage 852 to give the packet classifier 856 access to a packet header of the packet. With access to the packet header, the packet classifier 856 may ascertain from layer 3 of the packet header a destination IP address. The packet classifier 856 may use the destination IP address along with a queue mapping to select from the plurality of queues $811_i \ldots 811_n$ the queue that is mapped to the destination IP address ("selected queue"). The packet classifier 856 may, in turn, send the selected queue to the queue manager 836. The ingress-read controller 854 may also tread the packet length from the packet-size FIFO buffer 850 to the queue manager 836. The ingress-read controller 854 may tread the packet length and the packet data to the queue manager 836 in synchronization with the packet classifier 856 sending the selected queue to the queue manager 836.

Figure 8E:
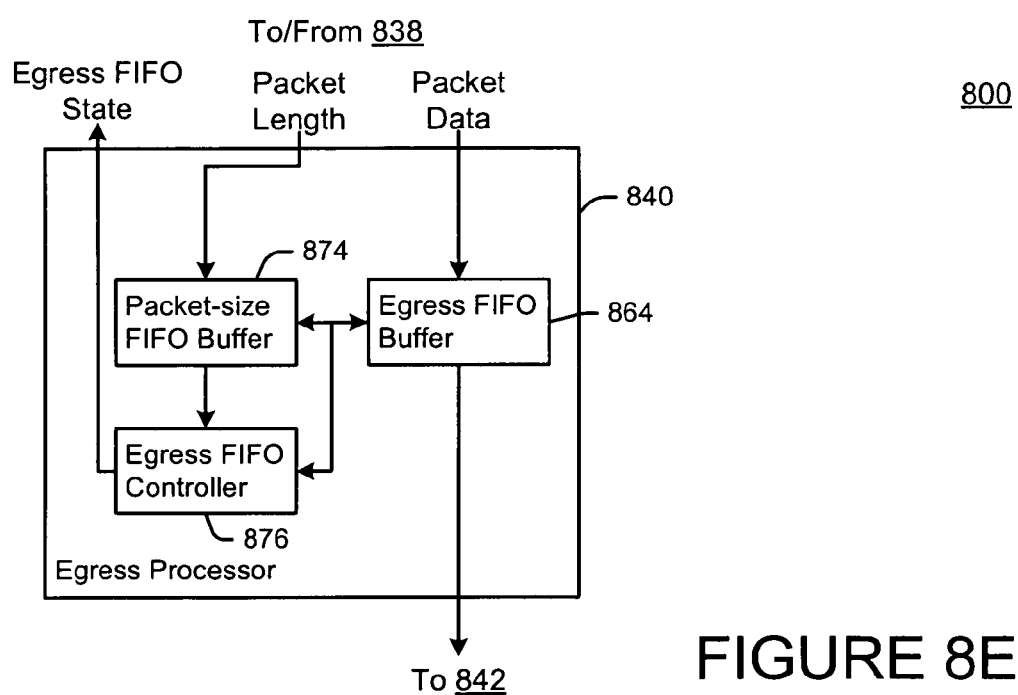
Figure 8C:
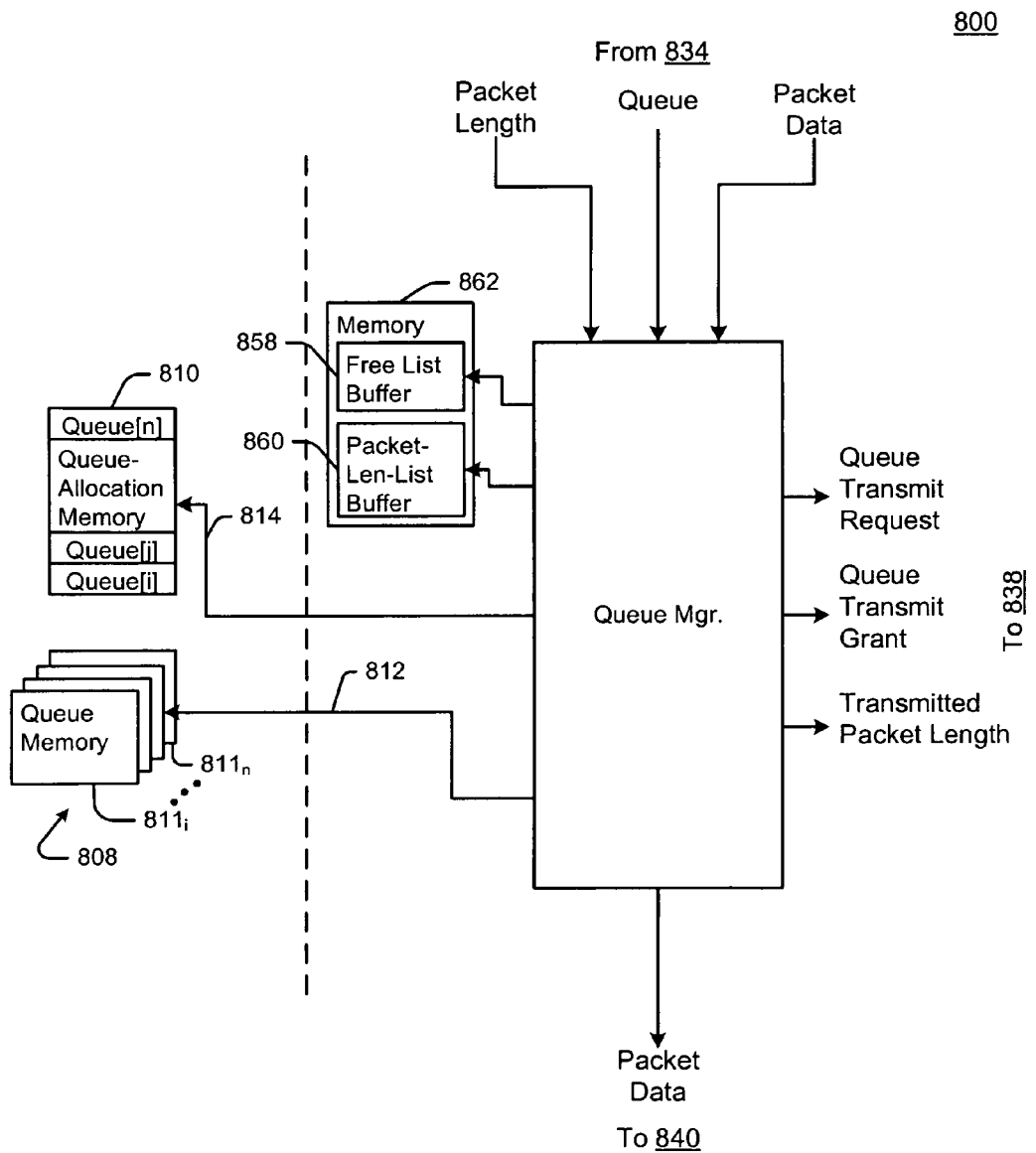

Referring now to FIG. 8C, the queue manager 836 may obtain and use the selected queue, packet data and packet length to control storage of the packet to a given block of the first memory 808. The queue manager 836 may, for example, pop a buffer pointer off the free list when it receives the packet from the ingress processor 834. The queue manager 836 may then add this pointer to the allocation table in the second memory 810 for the selected queue if the number of blocks already allocated for the selected queue is less than or equal to the maximum-block allocation. The queue manager 836 may, alternatively, tail drop the packet if the number of blocks already allocated for the selected queue is greater than the maximum-block allocation.

The queue manager 836 and the output scheduler 838 may exchange signals to schedule the packet for delivery to the egress processor 840 (FIG. 8E). The queue manager 836 may, for example, send to the output scheduler 838, for the selected queue, a signal that indicates that the selected queue is not empty. The output scheduler 838, in turn, may return a grant that indicates to the queue manager 836 that the packet can be read out of the selected queue and into an egress FIFO buffer 864 (FIG. 8E). The queue manager 836 may pop the buffer pointer for the selected queue from the allocation table and push it back into the free-list buffer 858 after the output scheduler 838 reads the entire packet from the first memory 808.

Figure 8D:
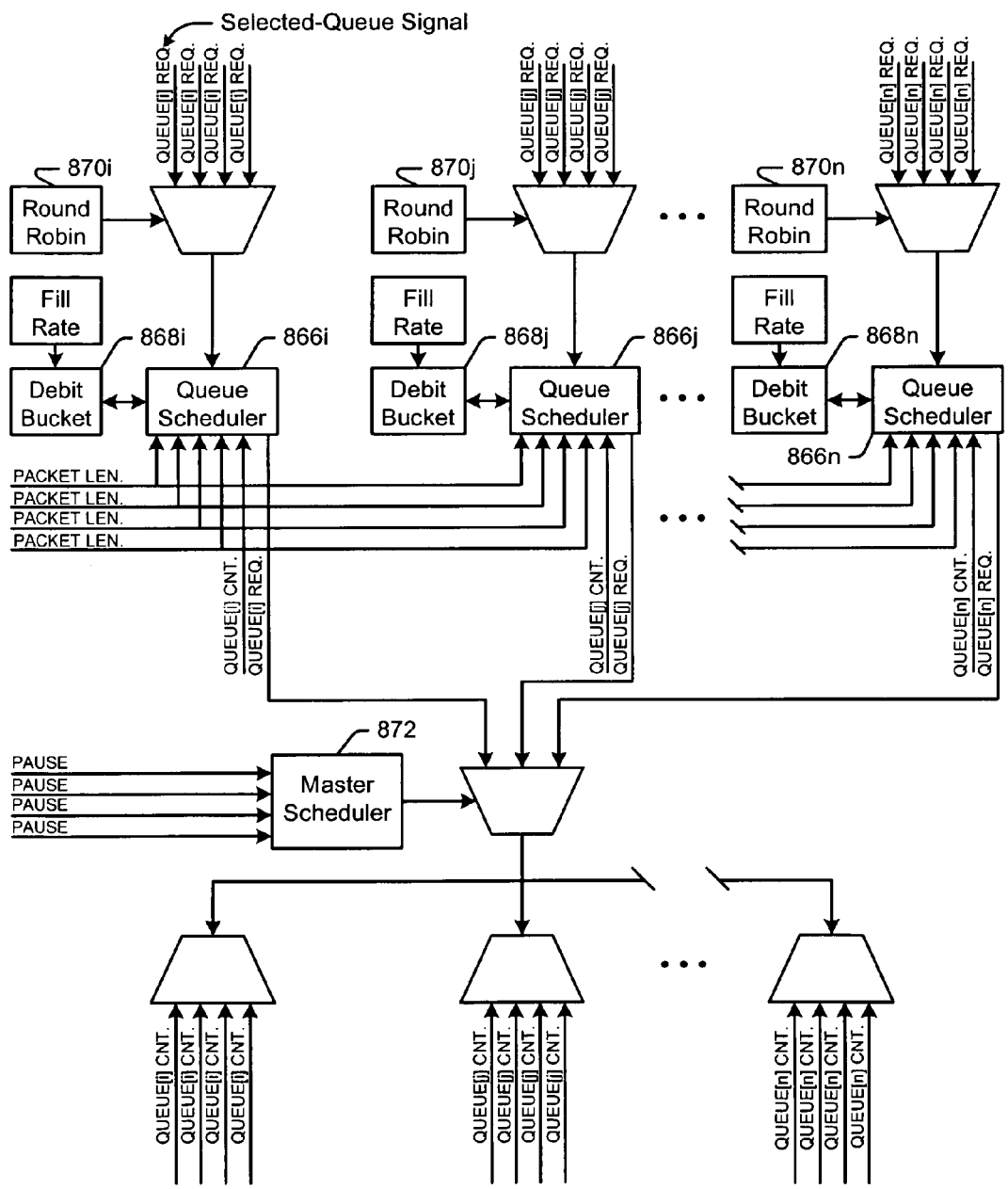

As shown in FIG. 8D, the output scheduler 838 includes a plurality of queue schedulers $866_i \ldots 866_j$. Each of the plurality of queues $811_i \ldots 811_n$ communicatively couples to one of the queue schedulers $866_i \ldots 866_j$. The output scheduler 838 also includes a plurality of debit buckets $868_i \ldots 868_j$; one for each of the queue schedulers $866_i \ldots 866_j$. The output scheduler 838 may further include a plurality of round-robin-job schedulers $870_i \ldots 870_j$; one for each of the queue schedulers $866_i \ldots 866_j$. The output scheduler 838 also includes a master scheduler 872.

The round-robin-job scheduler $870_i$ may receive from the queue manager 836 the signal indicating that the selected queue is not empty ("selected-queue-not-empty signal") along with similar signals from the other queues $811_i \ldots 811_n$ communicatively coupled to the round-robin-job scheduler $870_i$. After processing, round-robin-job scheduler $870_i$ passes the selected-queue-not-empty signal to the queue scheduler $866_i$. The queue scheduler $866_i$, pursuant to the debit bucket $868_i$ may issue to the queue manager 836 a request to send the packet from the selected queue ("selected-queue RTS").

For example, the queue scheduler $866_i$ may issue the selected-queue RTS when the debit bucket $868_i$ for the selected queue has a value of zero. The debit bucket $868_i$ for the selected queue may have a value of zero only after a given time period. This time period is formed as a function of the packet length, a software programmable value (i.e., a "full rate") and a time after which the queue scheduler $866_i$ sends the grant to read the packet out of selected queue and into an egress FIFO buffer 864.

For example, the time period begins when, in response to the grant, the queue scheduler $866_i$ receives from the queue manager 836 the packet length and loads it into the debit bucket $868_i$. Being non-zero, the debit bucket $868_i$ is decremented every cell time by the fill rate. A low value of fill rate indicates that the queue manager 836 has to wait longer after sending the packet before a subsequent packet can be sent. The fill rate effectively limits the transmit rate of the selected queue to a value programmed by software.

The egress processor 840 may signal to the master scheduler 872 when the egress FIFO buffer 864 has sufficient space to transmit a packet. The master scheduler 872 may decide to read the packet from the selected queue for transmission immediately. Alternatively, the master scheduler 872 may decide to read a packet from another one of the plurality of queues $811_i \ldots 811_n$ prior to the selected queue. To make the decision, the master scheduler 872 may round robin the selected-queue RTS with other RTs. The master scheduler 872 may thereafter issue a grant back to the queue manager 836 for the selected queue.

In one or more aspects of the technology, the master scheduler 872 may communicate with queue manager 836 over one or more dedicated busses. The master scheduler 872 and the queue manager 836 may exchange the selected-queue RTS and associated grant over, for example, a 25-bit bus, at 156.25 MHz clock rate. During a first two clocks of a cell, 50 bits of the grant are sent from the master scheduler 872 to the queue manager 836. During fifth and sixth clocks of the cell, the queue manager 836 sends 50 bits of the selected-queue RTS request to the master scheduler 872. During the seventh clock cycle of the cell, the selected queue returns the packet length.

As shown in FIG. 8E, the egress processor 840 may include the egress FIFO buffer 864, a packet-size FIFO buffer 874 and an egress FIFO controller 876; each of which communicatively couples with the other. As noted, the egress FIFO controller 876 may signal the output scheduler 838 when sufficient space exists in the egress FIFO 864 (e.g., at least 1518 bytes of space). In addition, the egress FIFO controller 876 may read the packet out of the egress FIFO buffer 864 into the egress stack 844 for subsequent forwarding.

In one or more aspects of the technology, a stream of minimum size Ethernet packets received at the ingress processor 834 may result in significant processing in the ingress processor 834. Because the minimum size Ethernet packets can arrive as fast as one 64 B packet every cell, ingress processor 834 may, every cell time: (i) calculate the packet length and write a packet into the ingress FIFO buffer 848; (ii) read a different packet from the ingress FIFO buffer 848 and classify it to the selected queue; (iii) pop a next buffer pointer from a top of the free-list buffer 858; (iv) push the buffer pointer for the selected queue to the allocation table; and (v) write to at least a portion of the packet to the first memory 808 from ingress FIFO buffer 848 at the address specified by the buffer pointer.

The egress processor 840 may perform the following every cell time: (i) decide which of the plurality of queues $811_i \ldots 811_n$ to transmit; (ii) pop the buffer pointer from the top of the allocated table for the selected queue; (iii) read at least a portion of the packet in the first memory 808 at the address specified by the buffer pointer from the allocated table to the egress FIFO buffer 864; and (iv) push the buffer pointer back to the free-list buffer 858.

Figure 9A:
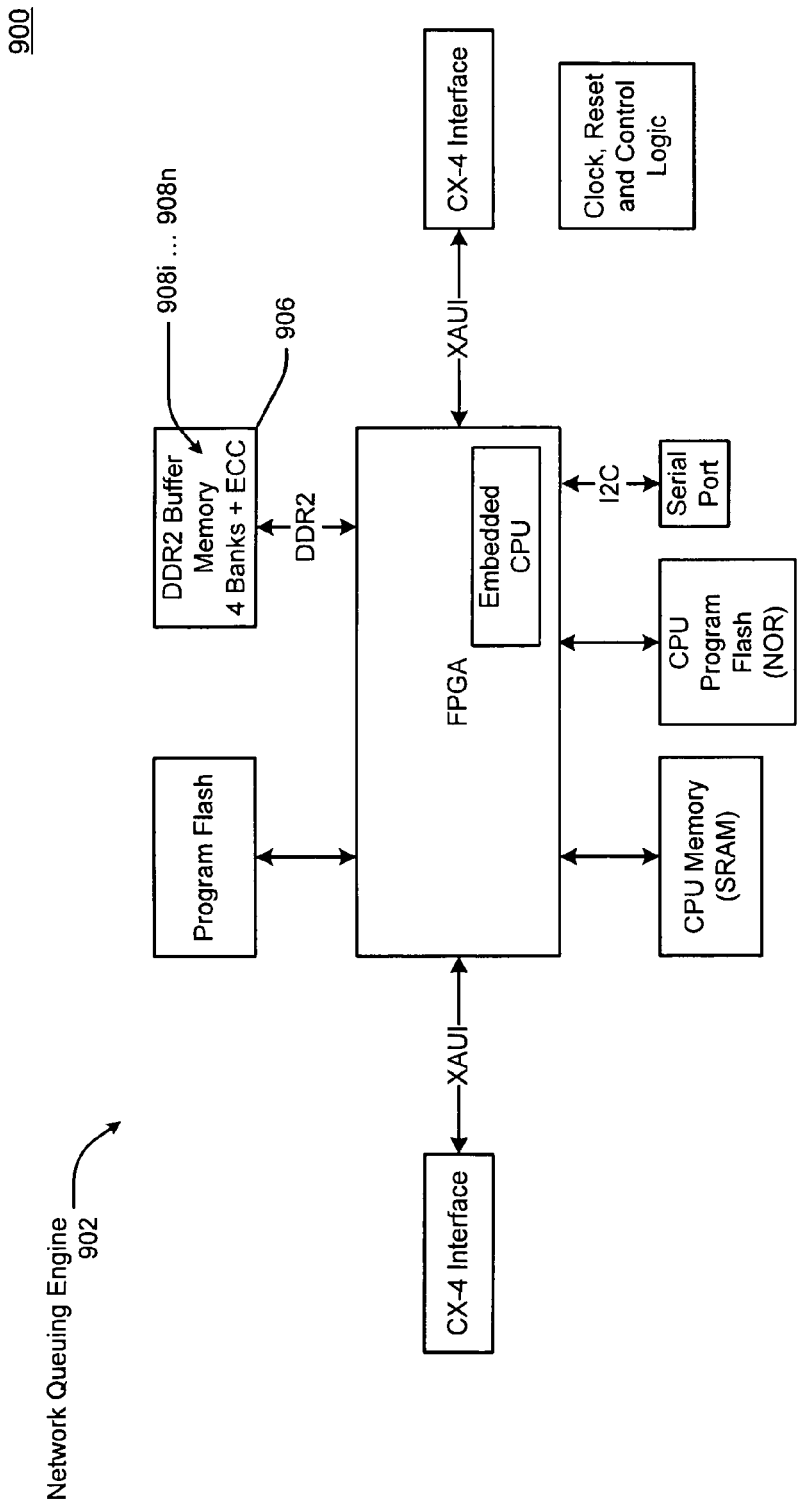
FIGS. 9A-9B are block diagrams illustrating another example architecture of a congestion-management node.
Figure 9B:
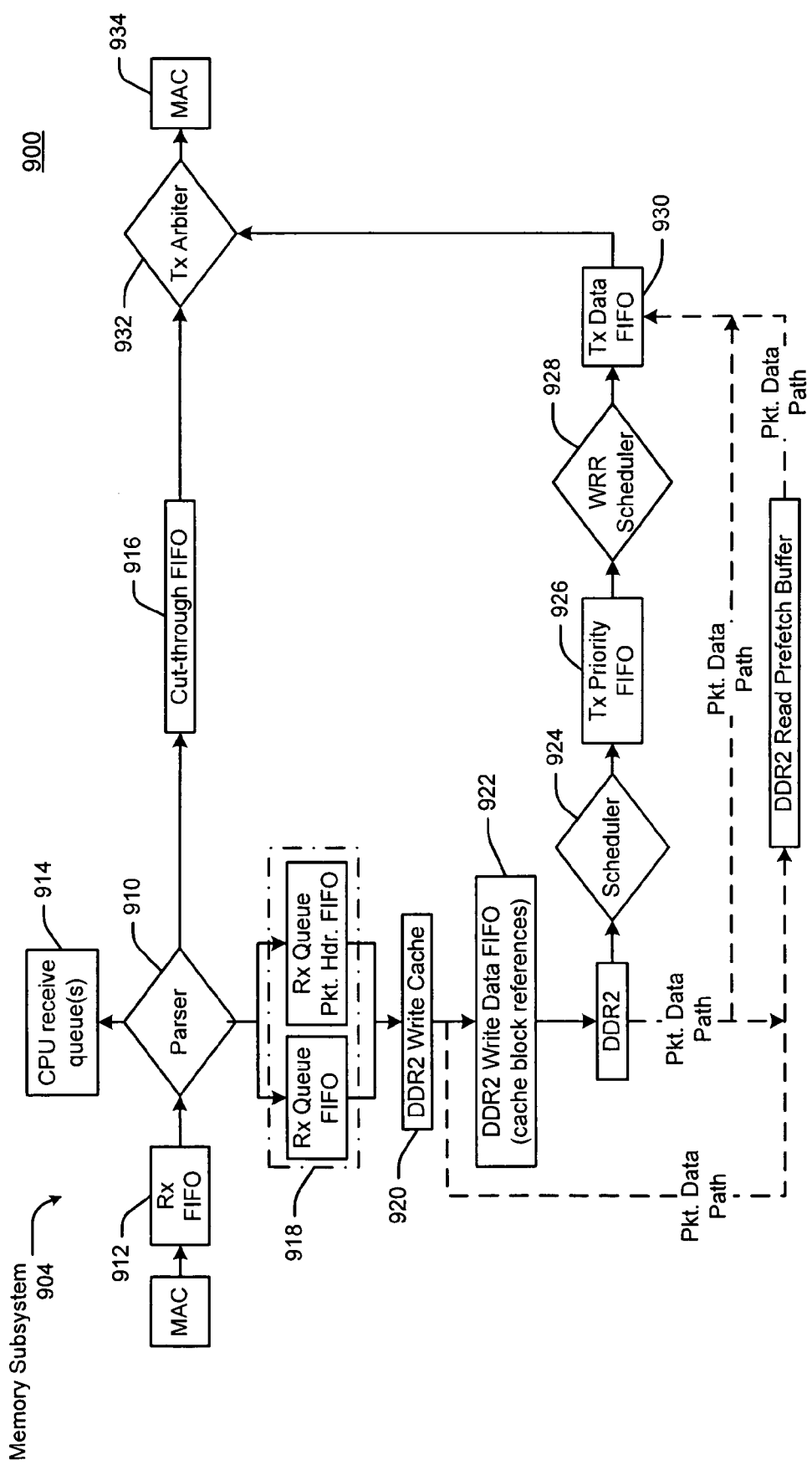

In accordance with one or more aspects of the technology, another example CM node 900 for performing congestion management is substantially shown in FIGS. 9A and 9B. The CM node 900 includes a queuing engine 902 (FIG. 8A) and a memory-management subsystem 904 (FIG. 8B). The queuing engine 902 and memory-management subsystem 904 may operate together to optimize usage of memory 906 for a plurality of queues $908_i \ldots 908_n$. In such an embodiment, a parser module 910 may examine data traffic received via a receive FIFO buffer 912. The parser module 910 may forward any flow control and/or congestion-notification messages to a processor 914 for further handling.

The parser module 910 may also make a determination as to whether to forward a data flow of data traffic to one of the plurality of queues $908_i \ldots 908_n$. To make determination, the parser module 910 checks for a match between a destination address of the data flow and a mapping of the plurality of queues $908_i \ldots 908_n$. The parser module 910 may pass the data flow to a cut-through transmit FIFO buffer 916 when no match exists. The parser module 910 may also pass the data flow to the cut-through transmit FIFO buffer 916 when (i) a match exists, (ii) the queue does not include any packets of the data flow, and (iii) a current bitrate for the data flow does not exceed a per-flow data bit rate limit. The parser module 910 may otherwise pass the data flow to a receive-queue FIFO buffer 918 for further handling.

The receive-queue FIFO buffer 918 may include a FIFO buffer for the packet data, and another FIFO buffer for packet header information, such as packet length and queue numbers. The receive-queue FIFO buffer 918 may, alternatively, include one FIFO buffers when packets are received in entirely before being parsed by the parser module 910. The packets may be moved from the receive-queue FIFO buffer 918 into either a per-queue write cache 920, or directly into a write FIFO memory 922 in the memory 904. The per-queue FIFO cache 920 may be organized as a block memory with a memory management unit to translate queue numbers into block numbers, which may be used to address the memory 906.

A scheduler 924 external to the memory subsystem 904 may determine a most optimal way to transfer the data flows from the per-queue write cache 920 into the write FIFO memory 922. For example, the scheduler 924 may merge multiple requests into single write bursts as often as possible.

The memory 906 may be organized into memory blocks. One of these memory blocks can be, for example, one Megabyte. The memory 906 may be associated with the plurality of queues $908_i \ldots 908_n$ using a linked memory block list (not shown). This memory block list may be, for example, implemented as an array, where an entry for one memory block points to the next memory block in the list.

Initially, no memory blocks or a single memory block are associated with each of the plurality of queues $908_i \ldots 908_n$. A memory allocation mechanism (not shown) may dynamically add additional memory blocks to any of the plurality of queues $908_i \ldots 908_n$. Similarly, when any of the plurality of queues $908_i \ldots 908_n$ no longer requires some or all of the memory blocks allocated to it, such unused memory blocks can be returned to a memory block free list (not shown).

The scheduler 924 may determine if and when data flows from any of the plurality of queues $908_i \ldots 908_n$ can be transmitted. Upon determining that one of the plurality of queues $908_i \ldots 908_n$ is ready to transmit a data flow, the scheduler 924 saves the number of the queue number in a per-priority FIFO buffer 926. A master scheduler 928, which may be implemented as a Weighted Round Robin scheduler or a fixed priority scheduler, may determine from which of the plurality of queues $908_i \ldots 908_n$ to send the data flow from. The master scheduler 928 schedules a transfer of the data flow from the memory 928 into a Transmit Data FIFO buffer 930. To optimize access speed to the memory 906, the master scheduler 928 may desirably send at least a fixed or configurable amount of the data flow in a single burst, such as 2 Kbytes. The master scheduler 928 may schedule multiple packets until the minimum burst size is reached before transmitting.

A transmit arbiter 932 may schedule the data flows from the cut-through transmit FIFO buffer 916 and the Transmit Data FIFO buffer 930. In accordance with such scheduling, the transmit arbiter 932 forwards the data flows to a MAC module 934.

Those skilled in the art will appreciate that the features of the present technology may be combined into further embodiments without departing from the scope of the technology. In view of the wide variety of embodiments that can be applied, it should be understood that the illustrated embodiments are exemplary only, and should not be taken as limiting.

In addition, any of the foregoing embodiments implemented as part of a network interconnect node, and connected to one or more ports of such network interconnect node in a single chassis. If implemented as an integral part of the network interconnect node, functionality of the foregoing embodiments may be further enhanced. For example, control logic (e.g., switch-control logic) of the network interconnect node may inform the queuing engine of destination ports for individual flows along with data rates on such ports. The queuing engine may use this information to automatically create one or more queues with appropriate data rates, thereby proactively preventing congestion conditions in the network interconnect node.

Further, each of the CM node 106, the gateway 306, the CM node 510 and/or elements thereof may be, include or employed by any of a general purpose computer, a special-purpose computer, a field programmable gate array ("FPGA"), an application specific integrated circuit ("ASIC"), a general purpose processor ("GPP"), a system on a chip ("SoC"), and the like. In addition, any of the embodiments may include a microcode engine or embedded processor to handle control messages, such as the congestion-notification messages and/or the flow-control (e.g., PAUSE and Priority PAUSE) messages. This way, after hardware detects control messages, it forwards them to the microcode engine or embedded processor. This allows flexible implementation and protocol changes in the field.

Moreover, the terms "packet" and/or "packets" in the foregoing disclosure are used to encompass any type of packet structure, including, for example, datagrams, frames, packets and other like-type structures. In addition, the foregoing description along with the figures appended hereto describe, note and/or denote processing platforms, computing systems, controllers, and other devices containing processors. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

It will be apparent to one of ordinary skill in the art that aspects of the technology, as described above, may be implemented in many different forms of software, firmware, and hardware in the implementations illustrated in the figures. The actual software code or specialized control hardware used to implement aspects consistent with the present technology is not limiting. Thus, the operation and behavior of the aspects were described without reference to the specific software code or hardware logic. It should be understood that a person of ordinary skill in the art would be able to design software and control hardware to implement the aspects described herein.

No element, act, or instruction used in the foregoing description should be construed as critical or essential to the technology unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

The invention claimed is:

1. A method comprising: receiving, via a first interface, a packet flow of data packets from a first network for forwarding to a node of a second network, the second network employing a protocol for managing congestion and the first network not employing any protocol for managing congestion; receiving, at a second interface, a notification from the second network that indicates that congestion is affecting communication with the node of the second network, wherein the protocol for managing congestion employed by the second network defines a given bitrate for sending at least one first packet in the packet flow to the node of the second network; responsive to the notification, calculating a first time and a second time to satisfy the given bitrate, enqueuing the packet flow into a process-controlled queue at the first time; dequeuing the at least the one first packet in the packet flow from the queue at the second time; and sending the at least one first packet of the packet flow to the node of the second network via the second interface.

2. The method of claim 1, wherein the notification from the second network includes the given bitrate defined by the protocol for managing congestion employed by the second network.

3. the method of claim 1, wherein enqueuing the packet flow into the queue at the first time comprises: pausing a flow of the at least one first packet in the packet flow to the second interface, and wherein dequeuing the at least one first packet in the packet flow from the queue at the second time comprises: resuming the flow of the at least one first packet in the packet flow to the second interface.

4. The method of claim 1, wherein the notification comprises a message formed in accordance with the protocol for managing congestion.

5. An apparatus comprising: a first interface for receiving a packet flow of data packets from a first network for forwarding to a node of a second network, the second network employing a protocol for managing congestion and the first network not employing any protocol for managing congestion; a second interface for receiving a notification from the second network that indicates that congestion is affecting communication with the node, wherein the protocol for managing congestion employed by the second network defines a given bitrate for sending at least one first packet in the packet flow to the node of the second network; a memory; and a processor that is configured to execute executable instructions to: calculate a first time and a second time to satisfy the given bitrate; enqueue the packet flow into a queue at the first time; dequeue the at least one first packet in the packet flow from the queue at the second time; and send the at least one first packet in the packet flow to the node of the second network via the second interface.

6. The apparatus of claim 5,
wherein the notification from the second network includes the given bitrate defined by the protocol for managing congestion employed by the second network.

7. The apparatus of claim 5, wherein the executable instructions further comprise one or more executable instructions to: pause a flow of the packet flow to the second interface, and dequeue the at least one first packet in the packet flow to resume the flow of the packet flow to the second interface.

8. The apparatus of claim 5, wherein the notification comprises a message formed in accordance with the protocol for managing congestion.

9. A method comprising:
receiving, at a first interface that communicatively couples with a first network, a first notification that indicates that congestion is affecting communication with a first node of the first network, the first network employing a protocol for managing congestion;
receiving, at the first interface, a second notification that indicates that congestion is affecting communication with a second node of the first network,
wherein the protocol for managing congestion employed by first network defines a first bitrate for sending at least one first packet in a first packet flow to the first node, and the protocol for managing congestion employed by the first network defines a second bitrate for sending at least one second packet in a second packet flow to the second node;
receiving, at a second interface that communicatively couples with a second network, the first packet flow including the at least one first packet from the second network for delivery to the first node, the second network not employing any protocol for managing congestion;

receiving, at the second interface, the second packet flow including the at least one second packet from the second network for delivery to the second node;

calculating a first time and a third time to satisfy the first bitrate;

calculating a second time and a forth time to satisfy the second bitrate;

enqueuing, by a processor, the first packet flow at the first time;

enqueuing, by the processor, the second packet flow at the second time;

dequeueing, by the processor, the at least one first packet of the first packet flow at the third time;

dequeueing, by the processor, the at least one second packet of the second packet flow at the fourth time;

sending the at least one first packet to the first node via the first interface; and sending the at least one second packet to the second node via the first interface.

10. The method of claim 9, wherein the first notification includes the first bitrate for sending the at least one first packet to the first node, and wherein the second notification includes the second bitrate for sending the at least one second packet to the second node.

11. An apparatus comprising:

a first interface that is configured to (i) communicatively couple with a first network, (ii) receive a first notification that indicates that congestion is affecting communication with a first node of the first network, and (iii) receive a second notification that indicates that congestion is affecting communication with a second node of the first network, the first networking employing a protocol for managing congestion, wherein the protocol for managing congestion employed by the first network defines a first bitrate for sending at least one first packet in a first flow of data packets to the first node, and, the protocol for managing congestion employed by the first network defines a second bitrate for sending at least one second packet in a second flow of data packets to the second node;

a second interface that is configured to (i) communicatively couple with a second network, (ii) receive the first packet flow including the at least one first packet from the second network for delivery to the first node, and (iii) receive the second packet flow including the at least one second packet from the second network for delivery to the second node, the second network not employing any protocol for managing congestion;

memory; and a processor that is configured to execute executable instructions to:

calculate a first time period to satisfy the first bitrate;

calculate a second time period to satisfy the second bitrate;

enqueue the first packet flow in the queue for the first time period;

enqueue the second packet flow in the queue for the second time period;

dequeue the at least one first packet of the first packet flow from the queue after the first time period;

dequeue the at least one second packet of the second packet flow from the queue after the second time period;

send the at least one first packet to the first node via the first interface; and send the at least one second packet to the second node via the first interface.

12. The apparatus of claim 11, wherein the first notification comprises a first message formed in accordance with the protocol for managing congestion, and wherein the second notification comprises a second message formed in accordance with the protocol for managing congestion.

13. The apparatus of claim 11, wherein the first notification includes the first bitrate for sending the at least one first packet to the first node, and wherein the second notification includes the second bitrate for sending the at least one second packet to the second node.

14. The apparatus of claim 11, wherein the first notification comprises a first indication to pause delivery of the at least one first packet, and wherein the second notification comprises a second indication to pause delivery of the at least one second packet.

* * * * *

UNITED STATES PATENT AND TRADEMARK OFFICE
CERTIFICATE OF CORRECTION

PATENT NO.        : 8,248,930 B2
APPLICATION NO.   : 12/387196
DATED             : August 21, 2012
INVENTOR(S)       : Robert Edman Felderman et al.

It is certified that error appears in the above-identified patent and that said Letters Patent is hereby corrected as shown below:

In the Claims
Column 28, line 7, "3. the method of" should read --3. The method of--
Column 28, line 59, "by first network" should read --by the first network--
Column 29, line 9, "forth time" should read --fourth time--

Signed and Sealed this
Eleventh Day of February, 2014

Michelle K. Lee
*Deputy Director of the United States Patent and Trademark Office*